United States Patent
Lavoie et al.

(10) Patent No.: US 9,616,923 B2
(45) Date of Patent: Apr. 11, 2017

(54) TOPOGRAPHICAL INTEGRATION FOR TRAILER BACKUP ASSIST SYSTEM

(71) Applicant: Ford Global Technologies, LLC, Dearborn, MI (US)

(72) Inventors: Erick Michael Lavoie, Dearborn, MI (US); Roger Arnold Trombley, Ann Arbor, MI (US); Hai Yu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/636,754

(22) Filed: Mar. 3, 2015

(65) Prior Publication Data

US 2016/0257341 A1    Sep. 8, 2016

(51) Int. Cl.
*B60W 50/08* (2012.01)
*B62D 13/06* (2006.01)
(Continued)

(52) U.S. Cl.
CPC .......... *B62D 13/06* (2013.01); *B60W 10/10* (2013.01); *B60W 10/18* (2013.01); *B60W 10/20* (2013.01);
(Continued)

(58) Field of Classification Search
USPC .......................................... 701/70, 31.4, 41
See application file for complete search history.

(56) References Cited

U.S. PATENT DOCUMENTS 3,542,390 A  11/1970  Fikse
3,605,088 A   9/1971  Savelli
(Continued)

FOREIGN PATENT DOCUMENTS

CN    202159367 U    3/2012
CN    102582686 B    9/2013
(Continued)

OTHER PUBLICATIONS

Sh. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

(Continued)

*Primary Examiner* — Thomas Tarcza
*Assistant Examiner* — Richard Goldman
(74) *Attorney, Agent, or Firm* — Raymond L. Coppiellie; Price Heneveld LLP

(57) ABSTRACT

A trailer backup assist system for vehicles utilizes surface slope data to provide an alert to an operator if a problematic operating condition is present and/or imminent while the vehicle is backing up with a trailer attached thereto. The trailer backup assist system may also be configured to utilize surface slope data to control steering, braking, or other vehicle operating parameter while the vehicle is backing up with a trailer attached thereto. The trailer backup assist system may also be configured to generate a warning and/or control the vehicle if a jackknife condition is imminent. The surface slope data may be obtained utilizing sensors on the vehicle, or the surface slope data may be obtained utilizing a database that includes topographical data.

25 Claims, 9 Drawing Sheets

(51) Int. Cl.
*B60W 10/20* (2006.01)
*B60W 10/18* (2012.01)
*B60W 10/10* (2012.01)
*B60W 40/02* (2006.01)
*B60W 40/10* (2012.01)
*B62D 15/02* (2006.01)

(52) U.S. Cl.
CPC ............ *B60W 40/02* (2013.01); *B60W 40/10* (2013.01); *B62D 15/021* (2013.01); *B62D 15/027* (2013.01); *B62D 15/0285* (2013.01); *B60W 2550/402* (2013.01); *B60W 2550/406* (2013.01)

(56) References Cited

U.S. PATENT DOCUMENTS

| | | |
|---|---|---|
| 3,756,624 A | 9/1973 | Taylor |
| 3,787,077 A | 1/1974 | Sanders |
| 3,833,928 A | 9/1974 | Gavit et al. |
| 3,860,257 A | 1/1975 | Mesly |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,735,432 A | 4/1988 | Brown |
| 4,752,080 A | 6/1988 | Rogers |
| 4,848,499 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A * | 9/1993 | Kendall ............... B62D 13/06 280/426 |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,586,814 A | 12/1996 | Steiner |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,056,371 A | 5/2000 | Lin et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,351,698 B1 * | 2/2002 | Kubota ............... B60R 16/0231 340/988 |
| 6,409,288 B2 | 6/2002 | Yoshida et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,567,731 B2 | 5/2003 | Chandy |
| 6,568,093 B2 | 5/2003 | Kogiso et al. |
| 6,577,952 B2 | 6/2003 | Geier et al. |
| 6,668,225 B2 | 12/2003 | Oh et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,117,077 B2 | 10/2006 | Michi et al. |
| 7,136,754 B2 | 11/2006 | Hahn et al. |
| 7,139,650 B2 | 11/2006 | Lubischer |
| 7,154,385 B2 | 12/2006 | Lee et al. |
| 7,159,890 B2 | 1/2007 | Craig et al. |
| 7,165,820 B2 | 1/2007 | Rudd, III |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,319,927 B1 | 1/2008 | Sun et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 * | 9/2010 | Padula ............... B62D 13/025 280/426 |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,969,326 B2 | 6/2011 | Sakakibara |
| 7,974,444 B2 | 7/2011 | Hongo |
| 8,010,252 B2 | 8/2011 | Getman et al. |
| 8,010,253 B2 | 8/2011 | Lundquist |
| 8,033,955 B2 | 10/2011 | Farnsworth |
| 8,036,792 B2 | 10/2011 | Dechamp |
| 8,038,166 B1 | 10/2011 | Piesinger |

(56) References Cited

U.S. PATENT DOCUMENTS

| | | |
|---|---|---|
| 8,044,779 B2 | 10/2011 | Hahn et al. |
| 8,073,594 B2 | 12/2011 | Lee et al. |
| 8,108,116 B2 | 1/2012 | Mori et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese, V et al. |
| 8,192,036 B2 | 6/2012 | Lee et al. |
| 8,215,436 B2 * | 7/2012 | DeGrave ............... B60L 7/08 180/165 |
| 8,223,204 B2 | 7/2012 | Hahn |
| 8,244,442 B2 * | 8/2012 | Craig ................... B60T 8/1708 701/48 |
| 8,260,518 B2 | 9/2012 | Englert |
| 8,267,485 B2 | 9/2012 | Barlsen et al. |
| 8,280,607 B2 * | 10/2012 | Gatti .................... B60W 10/06 701/110 |
| 8,308,182 B2 | 11/2012 | Ortmann et al. |
| 8,326,504 B2 | 12/2012 | Wu et al. |
| 8,342,560 B2 | 1/2013 | Albers et al. |
| 8,374,749 B2 | 2/2013 | Tanaka |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,430,792 B2 | 4/2013 | Noll |
| 8,469,125 B2 * | 6/2013 | Yu ........................ B62D 13/06 180/14.2 |
| 8,504,243 B2 | 8/2013 | Kageyama |
| 8,548,680 B2 | 10/2013 | Ryerson et al. |
| 8,548,683 B2 | 10/2013 | Cebon et al. |
| 8,571,758 B2 | 10/2013 | Klier et al. |
| 8,576,115 B2 | 11/2013 | Basten |
| 8,626,382 B2 | 1/2014 | Obradovich |
| 8,675,953 B1 | 3/2014 | Elwell et al. |
| 8,755,982 B2 | 6/2014 | Heckel et al. |
| 8,755,984 B2 | 6/2014 | Rupp et al. |
| 8,798,860 B2 | 8/2014 | Dechamp |
| 8,807,261 B2 | 8/2014 | Subrt et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,102,271 B2 | 8/2015 | Trombley et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,132,856 B2 | 9/2015 | Shepard |
| 9,180,890 B2 | 11/2015 | Lu et al. |
| 9,248,858 B2 | 2/2016 | Lavoie et al. |
| 9,290,202 B2 * | 3/2016 | Lavoie .................. B60W 30/00 |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 2001/0024333 A1 | 9/2001 | Rost |
| 2001/0037164 A1 | 11/2001 | Hecker |
| 2001/0052434 A1 | 12/2001 | Ehrlich et al. |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2005/0000738 A1 | 1/2005 | Gehring et al. |
| 2005/0128059 A1 | 6/2005 | Vause |
| 2005/0206225 A1 | 9/2005 | Offerle et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0198190 A1 | 8/2007 | Bauer et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0177443 A1 | 7/2008 | Lee et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0082935 A1 | 3/2009 | Leschuk et al. |
| 2009/0085775 A1 | 4/2009 | Otsuka et al. |
| 2009/0093928 A1 | 4/2009 | Getman et al. |
| 2009/0157260 A1 | 6/2009 | Lee |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0271078 A1 | 10/2009 | Dickinson |
| 2009/0300701 A1 | 12/2009 | Karaoguz et al. |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0063702 A1 * | 3/2010 | Sabelstrom ............... B60T 7/20 701/70 |
| 2010/0100272 A1 * | 4/2010 | Chen ....................... B60T 8/172 701/31.4 |
| 2010/0152989 A1 | 6/2010 | Smith et al. |
| 2010/0171828 A1 | 7/2010 | Ishii |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 * | 4/2011 | Lu ....................... B60G 17/0165 701/31.4 |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 * | 4/2012 | Klier ....................... B62D 7/159 701/41 |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 * | 12/2012 | Watanabe ............ B60W 40/112 702/154 |
| 2012/0316732 A1 | 12/2012 | Auer |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0148748 A1 | 6/2013 | Suda |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |

(56) References Cited

U.S. PATENT DOCUMENTS

| | | |
|---|---|---|
| 2013/0226431 A1* | 8/2013 | Lu .................... B60W 50/0098 701/96 |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1* | 3/2014 | Yu ...................... B60W 40/076 701/1 |
| 2014/0067155 A1* | 3/2014 | Yu ........................ B60W 40/13 701/1 |
| 2014/0085472 A1 | 3/2014 | Lu et al. |
| 2014/0088824 A1 | 3/2014 | Ishimoto |
| 2014/0121930 A1* | 5/2014 | Allexi .................... B60W 50/10 701/70 |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1* | 9/2014 | Aich ...................... H04N 7/181 348/113 |
| 2014/0267689 A1 | 9/2014 | Lavoie |
| 2014/0267868 A1 | 9/2014 | Mazzola et al. |
| 2014/0267869 A1 | 9/2014 | Sawa |
| 2014/0277941 A1* | 9/2014 | Chiu ...................... B62D 13/06 701/41 |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0002670 A1 | 1/2015 | Bajpai |
| 2015/0025732 A1 | 1/2015 | Min et al. |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1* | 4/2015 | Zhang ...................... B60D 1/06 280/477 |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2015/0269444 A1 | 9/2015 | Lameyre et al. |
| 2016/0009288 A1* | 1/2016 | Yu ...................... B60W 40/076 701/41 |
| 2016/0052548 A1 | 2/2016 | Singh et al. |
| 2016/0152263 A1 | 6/2016 | Singh et al. |
| 2016/0153778 A1 | 6/2016 | Singh et al. |

FOREIGN PATENT DOCUMENTS

| | | |
|---|---|---|
| DE | 3923676 A1 | 1/1991 |
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| EP | 0418653 A1 | 3/1991 |
| EP | 0433858 A2 | 6/1991 |
| EP | 1361543 A2 | 11/2003 |
| EP | 1655191 A1 | 5/2006 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 10119739 A | 5/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |

(56) References Cited

FOREIGN PATENT DOCUMENTS

| | | | |
|---|---|---|---|
| JP | 2008027138 A1 | 2/2008 |
| JP | 2012105158 A | 5/2012 |
| JP | 2012166580 A | 9/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2013186208 A2 | 12/2013 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |

OTHER PUBLICATIONS

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

Haviland, G S, "Automatic Brake Control for Trucks—What Good Is It?", TRID, Society of Automotive Engineers, Sep. 1968, 1 pg.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

"Understanding Tractor-Trailer Performance", Caterpillar, 2006, pp. 1-28.

C. Lundquist; W. Rein Elt; O. Enqvist, "Back Driving Assistant for Passenger Cars with Trailer", ZF Lenksysteme GmbH, Schwabisch Gmand, Germany, 2006 (SAE Int'l) Jan. 2006, pp. 1-8.

Olof Enqvist, "AFS-Assisted Trailer Reversing," Institutionen for systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge-Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

"Optionally Unmanned Ground Systems for any Steering-Wheel Based Vehicle" Universal. Unmanned., Kairos Autonomi, website: http://www.kairosautonomi.com/pronto4_system_html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

Novak, Domen; Dovzan, Dean; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

"Ford Super Duty: Truck Technologies", Brochure, Sep. 2011, 2 pages.

Kristopher Bunker, "2012 Guide to Towing", Trailer Life, 2012, 38 pages.

A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.

L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.

M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.

F.W. Kienhöfer; D. Cebon, "An Investigation of Abs Strategies for Articulated Vehicles", Cambridge University, Engineering Department, United Kingdom, date unknown, 13 pages.

C. Lundquist; W. Rein Elt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.

Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 6 pages.

A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.

Zare, A. Sharafi; M. Kamyad, A.V., "A New Approach in Intelligent Trailer Parking", IEEE, 2010 2nd International Mechanical and Electrical Technology (ICMET), Sep. 2010, 1 page.

Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.

Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.

(56) References Cited

OTHER PUBLICATIONS

Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zobel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rustern, "Fuzzy Backing Control of Truck and Two Trailers", Tallinn University of Technology; Tallinn, Estonia, date unknown, 6 pages.
Jane Mcgrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor- Semi- Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With Lin Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen for systemteknik Deartment of Electrical Engineering, Jan. 27, 2006, 57 pages.
M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

\* cited by examiner

TOPOGRAPHICAL INTEGRATION FOR TRAILER BACKUP ASSIST SYSTEM

CROSS-REFERENCE TO RELATED APPLICATIONS

This application is related to U.S. Pat. No. 9,506,774 which issed on Nov. 29, 2016, entitled "METHOD OF INPUTTING A PATH FOR A VEHICLE AND TRAILER, which is related to U.S. Pat. No. 9,493,187, which issued on Nov. 15, 2016, entitled "CONTROL FOR TRAILER BACKUP ASSIST SYSTEM" which is a continuation-in-part of U.S. Pat. No. 9,374,562, which issued on Jun. 21, 2016, entitled "SYSTEM AND METHOD FOR CALCULATING A HORIZONTAL CAMERA TO TARGET DISTANCE," which is a continuation-in-part of U.S. patent application Ser. No. 14/243,530, which was filed on Apr. 2, 2014, entitled "HITCH ANGLE SENSOR ASSEMBLY," which is a continuation-in-part of U.S. Pat. No. 9,290,202, which issued on Mar. 22, 2016, entitled "SYSTEM AND METHOD OF CALIBRATING A TRAILER BACKUP ASSIST SYSTEM," which is a continuation-in-part of U.S. patent application Ser. No. 14/188,213, which was filed on Feb. 24, 2014, entitled "SENSOR SYSTEM AND METHOD FOR MONITORING TRAILER HITCH ANGLE," which is a continuation-in-part of U.S. patent application Ser. No. 13/847,508, which was filed on Mar. 20, 2013, entitled "HITCH ANGLE ESTIMATION." U.S. patent application Ser. No. 14/188,213 is also a continuation-in-part of co-pending U.S. Pat. No. 9,346,396, which issued on May 24, 2016, entitled "SUPPLEMENTAL VEHICLE LIGHTING SYSTEM FOR VISION BASED TARGET DETECTION," which is a continuation-in-part of U.S. Pat. No. 9,102,721, which issued on Aug. 11, 2015, entitled "TRAILER MONITORING SYSTEM AND METHOD," which is a continuation-in-part of U.S. Pat. No. 9,248,858, which issued on Feb. 2, 2016, entitled "TRAILER BACKUP ASSIST SYSTEM," which is a continuation-in-part of U.S. Pat. No. 8,825,328 which issued on Sep. 2, 2014, entitled "DETECTION OF AND COUNTERMEASURES FOR JACKKNIFE ENABLING CONDITIONS DURING TRAILER BACKUP ASSIST," which is a continuation-in-part of U.S. Pat. No. 8,909,426, which issued on Dec. 9, 2014, entitled "TRAILER PATH CURVATURE CONTROL FOR TRAILER BACKUP ASSIST," which claims benefit from U.S. Provisional Patent Application No. 61/477,132, which was filed on Apr. 19, 2011, entitled "TRAILER BACKUP ASSIST CURVATURE CONTROL." The aforementioned related applications are hereby incorporated by reference in their entirety.

FIELD OF THE INVENTION

The disclosure made herein relates generally to driver assist and active safety technologies in vehicles, and more particularly to a trailer backup assist system that utilizes topographical information.

BACKGROUND OF THE INVENTION

Reversing a vehicle while towing a trailer may be difficult. One reason for such difficulty is that backing-up a vehicle with an attached trailer requires steering inputs that are opposite to normal steering when backing-up the vehicle without a trailer attached and/or requires braking to stabilize the vehicle-trailer combination before a jackknife condition occurs. Another reason for such difficulty is that small errors in steering while backing-up a vehicle with an attached trailer are amplified thereby causing the trailer to depart from a desired path.

Known trailer backup assist systems may assume that a driver of a vehicle with an attached trailer wants to backup straight and the system either implicitly or explicitly assumes a zero curvature path for the vehicle-trailer combination. Most real-world situations involve a curved trailer path. Thus, assuming a path of zero curvature may significantly limit the usefulness of the system.

Some known systems assume that a path is known from a map or path planner. To this end, some known trailer backup assist systems operate under a requirement that a trailer backup path is known before backing-up of the trailer commences such as, for example, from a map or a path-planning algorithm. Such systems may have a relatively complex human machine interface (HMI) device to specify the path, obstacles and/or goal of the backup maneuver.

Another reason backing-up a trailer can prove to be difficult is the need to control the vehicle in a manner that limits the potential for a jackknife condition to occur. Typically, a jackknife condition exists when the hitch angle cannot be reduced (i.e., made less acute) while continuously backing-up a trailer by application of a maximum steering input for the vehicle. If the jackknife angle has been reached or exceeded, the vehicle must be pulled forward to reduce the hitch angle in order to eliminate the jackknife condition and, thus, allow the hitch angle to be controlled via manipulation of the steered wheels of the vehicle. The jackknife condition can also lead to damage to the vehicle and/or trailer if certain operating conditions of the vehicle relating to its speed, engine torque, acceleration, and the like are not detected and counteracted. For example, if the vehicle is travelling at a sufficiently high speed in reverse and/or subjected to a sufficiently high longitudinal acceleration when the jackknife condition is achieved, the relative movement of the vehicle with respect to the trailer can lead to contact between the vehicle and trailer thereby damaging the trailer and/or the vehicle.

SUMMARY OF THE INVENTION

One aspect of the present invention is a method of utilizing surface slope data to alert an operator and/or to control a vehicle having a trailer backup assist system for use in backing-up the vehicle when a trailer is connected to the vehicle. The vehicle defines a plurality of operating parameters, and the vehicle and trailer together define at least one predefined problematic operating condition that is to be avoided when the trailer is connected to the vehicle and the vehicle is backing-up. When backing-up, a response of the trailer to changes in the vehicle operating parameters changes due to changes in surface slope encountered by the vehicle and/or the trailer. The method includes providing a trailer backup assist system, and configuring the trailer backup assist system to utilize surface slope data to provide an alert to an operator if a problematic operating condition is present and/or imminent while the vehicle is backing-up with a trailer attached thereto. The trailer backup assist system may also be configured to control at least one vehicle operating parameter while the vehicle is backing-up with a trailer attached thereto by utilizing the surface slope data. The surface slope data may be obtained utilizing sensors on the vehicle, or the surface slope data may be obtained utilizing topographical data. The position of the vehicle may be obtained utilizing a Global Positioning System (GPS) device. The trailer backup assist system may be configured to control vehicle steering, braking, or other vehicle control parameters effecting the speed and/or trajectory of the vehicle while backing-up. The trailer backup assist system may be configured to avoid ravines, hills having excessive slope, and/or other obstacles identified utilizing topographical data. The trailer backup assist system may also be configured to generate a warning and/or control the vehicle if a jackknife condition is imminent. Predicting a jackknife condition may involve taking into account surface slope data.

Another aspect of the present invention is a method of controlling a vehicle. The method includes providing topographical data to a trailer backup assist system whereby at least one of a vehicle brake and steering system is controlled by the trailer backup assist system to avoid an obstacle identified utilizing the topographical data. The obstacle may comprise a topographical feature such as a ravine or hill having a slope that exceeds a predefined maximum allowable slope.

These and other aspects, objects, and features of the present invention will be understood and appreciated by those skilled in the art upon studying the following specification, claims, and appended drawings.

DETAILED DESCRIPTION OF THE PREFERRED EMBODIMENTS

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

The present invention involves the use of topographical or surface slope data in a trailer backup assist system of a vehicle to control the vehicle when the vehicle is backing-up and/or to alert/warn a vehicle operator that an unsafe/undesirable operating condition (e.g. jackknifing, excessive speed, etc.) is about to occur. FIGS. 1-8 and the corresponding written description below generally disclose a vehicle 1 having a trailer backup assist system 105 that can be utilized to control the vehicle 1 when vehicle 1 and trailer 10 are backing-up on or near a sloped surface as described in more detail below in connection with FIGS. 9 and 10. However, it will be understood that the present invention is not necessarily limited to the specific trailer backup assist system of FIGS. 1-8.

Figure 1:
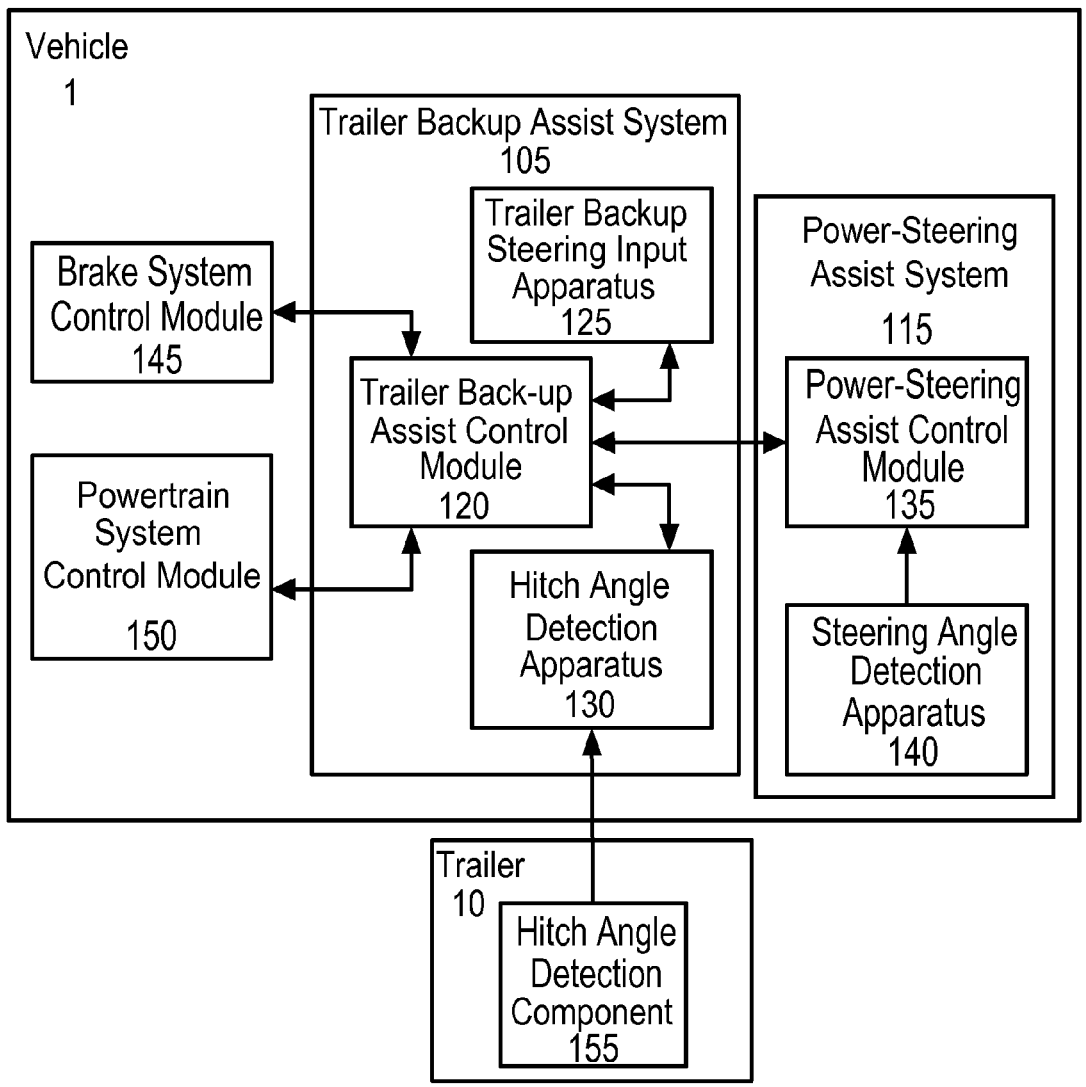
FIG. 1 is a schematic drawing of a vehicle-trailer combination, wherein the vehicle is configured for performing trailer backup assist functionality in accordance with one aspect of the present invention.

Referring to FIG. 1, an embodiment of a vehicle 1 configured for performing trailer backup assist functionality is shown. A trailer backup assist system 105 of the vehicle 1 controls the curvature of path of travel of a trailer 10 that is attached to the vehicle 1. Such control is accomplished through interaction of a power assisted steering system 115 of the vehicle 1 and the trailer backup assist system 105. During operation of the trailer backup assist system 105 while the vehicle 1 is being reversed, a driver of the vehicle 1 is sometimes limited in the manner in which he/she can make steering inputs via a steering wheel of the vehicle 1. This is because in certain vehicles the trailer backup assist system 105 is in control of the power assisted steering system 115 and the power assisted steering system 115 is directly coupled to the steering wheel (i.e., the steering wheel of the vehicle 1 moves in concert with steered wheels of the vehicle 1). As is discussed below in greater detail, a human machine interface (HMI) device of the trailer backup assist system 105 is used for commanding changes in curvature of a path of the trailer 10 such as a knob, thereby decoupling such commands from being made at the steering wheel of the vehicle 1. However, some vehicles configured to provide trailer backup assist functionality in accordance with the disclosed subject matter will have the capability to selectively decouple steering movement from movement of steerable wheels of the vehicle, thereby allowing the steering wheel to be used for commanding changes in curvature of a path of a trailer during such trailer backup assist.

The trailer backup assist system 105 includes a trailer backup assist control module 120, a trailer backup steering input apparatus 125, and a hitch angle detection apparatus 130. The trailer backup assist control module 120 is connected to the trailer backup steering input apparatus 125 and the hitch angle detection apparatus 130 for allowing communication of information therebetween. It is disclosed herein that the trailer backup steering input apparatus can be coupled to the trailer backup assist control module 120 in a wired or wireless manner. The trailer backup assist system control module 120 is attached to a power steering assist control module 135 of the power steering assist system 115 for allowing information to be communicated therebetween. A steering angle detection apparatus 140 of the power steering assist system 115 is connected to the power steering assist control module 135 for providing information thereto. The trailer backup assist system is also attached to a brake system control module 145 and a powertrain control module 150 for allowing communication of information therebetween. Jointly, the trailer backup assist system 105, the power steering assist system 115, the brake system control module 145, the powertrain control module 150, and the gear selection device (PRNDL), define a trailer backup assist architecture configured in accordance with an embodiment.

The trailer backup assist control module 120 is configured for implementing logic (i.e., instructions) for receiving information from the trailer backup steering input apparatus 125, the hitch angle detection apparatus 130, the power steering assist control module 135, the brake system control module 145, and the powertrain control module 150. The trailer backup assist control module 120 (e.g., a trailer curvature algorithm thereof) generates vehicle steering information as a function of all or a portion of the information received from the trailer backup steering input apparatus 125, the hitch angle detection apparatus 130, the power steering assist control module 135, the brake system control module 145, and the powertrain control module 150. Thereafter, the vehicle steering information is provided to the power steering assist control module 135 for affecting steering of the vehicle 1 by the power steering assist system 115 to achieve a commanded path of travel for the trailer 10.

The trailer backup steering input apparatus 125 provides the trailer backup assist control module 120 with information defining the commanded path of travel of the trailer 10 to the trailer backup assist control module 120 (i.e., trailer steering information). The trailer steering information can include information relating to a commanded change in the path of travel (e.g., a change in radius of path curvature) and information relating to an indication that the trailer is to travel along a path defined by a longitudinal centerline axis of the trailer (i.e., along a substantially straight path of travel). As will be discussed below in detail, the trailer backup steering input apparatus 125 preferably includes a rotational control input device for allowing a driver of the vehicle 1 to interface with the trailer backup steering input apparatus 125 to command desired trailer steering actions (e.g., commanding a desired change in radius of the path of travel of the trailer and/or commanding that the trailer travel along a substantially straight path of travel as defined by a longitudinal centerline axis of the trailer). In a preferred embodiment, the rotational control input device is a knob rotatable about a rotational axis extending through a top surface/face of the knob. In other embodiments, the rotational control input device is a knob rotatable about a rotational axis extending substantially parallel to a top surface/face of the knob.

Some vehicles (e.g., those with active front steer) have a power steering assist system configuration that allows a steering wheel to be partially decoupled from movement of the steered wheels of such a vehicle. Accordingly, the steering wheel can be rotated independent of the manner in which the power steering assist system of the vehicle controls the steered wheels (e.g., as commanded by vehicle steering information provided by a power steering assist system control module from a trailer backup assist system control module configured in accordance with one embodiment). As such, in these types of vehicles where the steering wheel can be selectively decoupled from the steered wheels to allow independent operation thereof, trailer steering information of a trailer backup assist system configured in accordance with the disclosed subject matter can be provided through rotation of the steering wheel. Accordingly, it is disclosed herein that in certain embodiments, the steering wheel is an embodiment of a rotational control input device in the context of the disclosed subject matter. In such embodiments, the steering wheel would be biased (e.g., by an apparatus that is selectively engageable/activatable) to an at-rest position between opposing rotational ranges of motion.

The hitch angle detection apparatus 130, which operates in conjunction with a hitch angle detection component 155 of the trailer 10, provides the trailer backup assist control module 120 with information relating to an angle between the vehicle 1 and the trailer 10 (i.e., hitch angle information). In a preferred embodiment, the hitch angle detection apparatus 130 is a camera-based apparatus such as, for example, an existing rear view camera of the vehicle 1 that images (i.e., visually monitors) a target (i.e., the hitch angle detection component 155) attached the trailer 10 as the trailer 10 is being backed by the vehicle 1. Preferably, but not necessarily, the hitch angle detection component 155 is a dedicated component (e.g., an item attached to/integral with a surface of the trailer 10 for the express purpose of being recognized by the hitch angle detection apparatus 130). Alternatively, the hitch angle detection apparatus 130 can be a device that is physically mounted on a hitch component of the vehicle 1 and/or a mating hitch component of the trailer 10 for determining an angle between centerline longitudinal axes of the vehicle 1 and the trailer 10. The hitch angle detection apparatus 130 can be configured for detecting a jackknife enabling condition and/or related information (e.g., when a hitch angle threshold has been met).

The power steering assist control module 135 provides the trailer backup assist control module 120 with information relating to a rotational position (e.g., angle) of the steering wheel angle and/or a rotational position (e.g., turning angle(s)) of steered wheels of the vehicle 1. In certain embodiments, the trailer backup assist control module 120 can be an integrated component of the power steering assist system 115. For example, the power steering assist control module 135 can include a trailer backup assist algorithm for generating vehicle steering information as a function of all or a portion of information received from the trailer backup steering input apparatus 125, the hitch angle detection apparatus 130, the power steering assist control module 135, the brake system control module 145, and the powertrain control module 150.

The brake system control module 145 provides the trailer backup assist control module 120 with information relating to vehicle speed. Such vehicle speed information can be determined from individual wheel speeds as monitored by the brake system control module 145 or may be provided by an engine control module with signal plausibility. Vehicle speed may also be determined from an engine control module. In some instances, individual wheel speeds can also be used to determine a vehicle yaw rate and such yaw rate can be provided to the trailer backup assist control module 120 for use in determining the vehicle steering information. In certain embodiments, the trailer backup assist control module 120 can provide vehicle braking information to the brake system control module 145 for allowing the trailer backup assist control module 120 to control braking of the vehicle 1 during backing-up of the trailer 10. For example, using the trailer backup assist control module 120 to regulate speed of the vehicle 1 during backing-up of the trailer 10 can reduce the potential for unacceptable trailer backup conditions. Examples of unacceptable trailer backup conditions include, but are not limited to, a vehicle over speed condition, a high hitch angle rate, hitch angle dynamic instability, a calculated theoretical trailer jackknife condition (defined by a maximum vehicle steering angle, drawbar length, tow vehicle wheelbase and an effective trailer length), or physical contact jackknife limitation (defined by an angular displacement limit relative to the vehicle 1 and the trailer 10), and the like. As discussed in more detail below in connection with FIGS. 9 and 10, unacceptable trailer backup conditions may also include obstacles in the path of the vehicle 1 and trailer 10 such as excessive surface slope, ravines, objects, buildings or the like. It is disclosed herein that the backup assist control module 120 can issue a signal corresponding to a notification (e.g., a warning) of an actual, impending, and/or anticipated unacceptable trailer backup condition.

The powertrain control module 150 interacts with the trailer backup assist control module 120 for regulating speed and acceleration of the vehicle 1 during backing-up of the trailer 10. As mentioned above, regulation of the speed of the vehicle 1 is necessary to limit the potential for unacceptable trailer backup conditions such as, for example, jackknifing and hitch angle dynamic instability. Similar to high-speed considerations as they relate to unacceptable trailer backup conditions, high acceleration and high dynamic driver curvature requests can also lead to such unacceptable trailer backup conditions.

Figure 2:
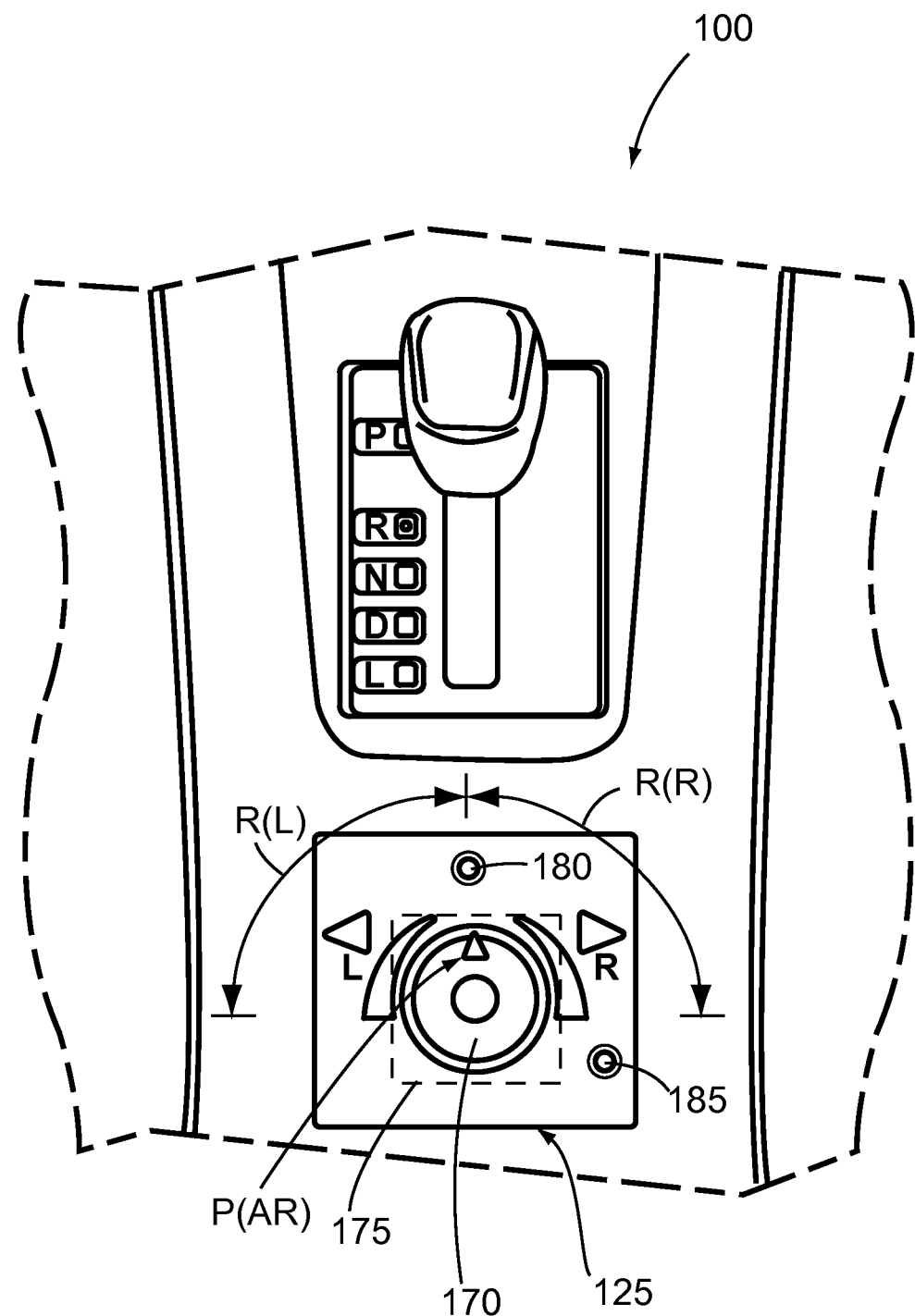
FIG. 2 is a partially fragmentary view of an embodiment of the trailer backup steering input apparatus.

Referring now to FIG. 2, an embodiment of the trailer backup steering input apparatus 125 discussed in reference to FIG. 1 is shown. A rotatable control element in the form of a knob 170 is coupled to a movement sensing device 175. The knob 170 is biased (e.g., by a spring return) to an at-rest position P(AR) between opposing rotational ranges of motion R(R), R(L). A first one of the opposing rotational ranges of motion R(R) is substantially equal to a second one of the opposing rotational ranges of motion R(L), R(R). To provide a tactile indication of an amount of rotation of the knob 170, a force that biases the knob 170 toward the at-rest position P(AR) can increase (e.g., non-linearly) as a function of the amount of rotation of the knob 170 with respect to the at-rest position P(AR). Additionally, the knob 170 can be configured with position indicating detents such that the driver can positively feel the at-rest position P(AR) and feel the ends of the opposing rotational ranges of motion R(L), R(R) approaching (e.g., soft end stops).

The movement sensing device 175 is configured for sensing movement of the knob 170 and outputting a corresponding signal (i.e., movement sensing device signal) to the trailer assist backup input apparatus 125 shown in FIG. 1. The movement sensing device signal is generated as a function of an amount of rotation of the knob 170 with respect to the at-rest position P(AR), a rate movement of the knob 170, and/or a direction of movement of the knob 170 with respect to the at-rest position P(AR). As will be discussed below in greater detail, the at-rest position P(AR) of the knob 170 corresponds to a movement sensing device signal indicating that the vehicle 1 should be steered such that the trailer 10 is backed along a substantially straight path (zero trailer curvature request from the driver) as defined by a centerline longitudinal axis of the trailer 10 when the knob 170 was returned to the at-rest position P(AR) and a maximum clockwise and counter-clockwise position of the knob 170 (i.e., limits of the opposing rotational ranges of motion R(R), R(L)) each correspond to a respective movement sensing device signal indicating a tightest radius of curvature (i.e., most acute trajectory) of a path of travel of the trailer 10 that is possible without the corresponding vehicle steering information causing a jackknife condition. In this regard, the at-rest position P(AR) is a zero curvature commanding position with respect to the opposing rotational ranges of motion R(R), R(L). It is disclosed herein that a ratio of a commanded curvature of a path of a trailer (e.g., radius of a trailer trajectory) and a corresponding amount of rotation of the knob can vary (e.g., non-linearly) over each one of the opposing rotational ranges of motion P(L), P(R) of the knob 170. It is also disclosed therein that the ratio can be a function of vehicle speed, trailer geometry, vehicle geometry, hitch geometry and/or trailer load.

Use of the knob 170 decouples trailer steering inputs from being made at a steering wheel of the vehicle 1. In use, as a driver of the vehicle 1 backs the trailer 10, the driver can turn the knob 170 to provide an operator steering request signal corresponding to a desired curvature of a path of the trailer 10 to follow and returns the knob 170 to the at-rest position P(AR) for causing the trailer 10 to be backed along a straight line. Accordingly, in embodiments of trailer backup assist systems where the steering wheel remains physically coupled to the steerable wheels of a vehicle during backup of an attached trailer, a rotatable control element configured in accordance with the disclosed subject matter (e.g., the knob 170) provides a simple and user-friendly means of allowing a driver of a vehicle to input trailer steering commands.

It is disclosed herein that a rotational control input device configured in accordance with embodiments of the disclosed subject matter (e.g., the knob 170 and associated movement sensing device) can omit a means for being biased to an at-rest position between opposing rotational ranges of motion. Lack of such biasing allows a current rotational position of the rotational control input device to be maintained until the rotational control input device is manually moved to a different position. Preferably, but not necessarily, when such biasing is omitted, a means is provided for indicating that the rotational control input device is positioned in a zero curvature commanding position (e.g., at the same position as the at-rest position in embodiments where the rotational control input device is biased). Examples of means for indicating that the rotational control input device is positioned in the zero curvature commanding position include, but are not limited to, a detent that the rotational control input device engages when in the zero curvature commanding position, a visual marking indicating that the rotational control input device is in the zero curvature commanding position, an active vibratory signal indicating that the rotational control input device is in or approaching the zero curvature commanding position, an audible message indicating that the rotational control input device is in of approaching the zero curvature commanding position, and the like.

It is also disclosed herein that embodiments of the disclosed subject matter can be configured with a control input device that is not rotational (i.e., a non-rotational control input device). Similar to a rotational control input device configured in accordance with embodiments of the disclosed subject matter (e.g., the knob 170 and associated movement sensing device), such a non-rotational control input device is configured to selectively provide a signal causing a trailer to follow a path of travel segment that is substantially straight and to selectively provide a signal causing the trailer to follow a path of travel segment that is substantially curved. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input path of travel commands, or joystick type input and the like.

The trailer backup steering input apparatus 125 can be configured to provide various feedback information to a driver of the vehicle 1. Examples of situation that such feedback information can include, but are not limited to, a status of the trailer backup assist system 105 (e.g., active, in standby (e.g., when driving forward to reduce the hitch angle and zero hitch angle to remove bias), faulted, inactive, etc.), that a curvature limit has been reached (i.e., maximum commanded curvature of a path of travel of the trailer 10), and/or a graphical representation of the vehicle and trailer orientation state. To this end, the trailer backup steering input apparatus 125 can be configured to provide a tactile feedback signal (e.g., a vibration through the knob 170) as an alert or warning if any one of a variety of conditions occur. Examples of such conditions include, but are not limited to, the trailer 10 approaching jackknife, the trailer backup assist system 105 has had a failure, the trailer backup assist system 105 has detected a fault, the trailer backup assist system 105 or other system of the vehicle 1 has predicted a collision on the present path of travel of the trailer 10, the trailer backup assist system 105 has restricted a commanded curvature of a trailer's path of travel (e.g., due to excessive speed or acceleration of the vehicle 1), and the like. Still further, it is disclosed that the trailer backup steering input apparatus 125 can use illumination (e.g., an LED 180) and/or an audible signal output (e.g., an audible output device 185 or through attached vehicle audio speakers) to provide certain feedback information (e.g., notification/warning of an unacceptable trailer backup condition).

Figure 3:
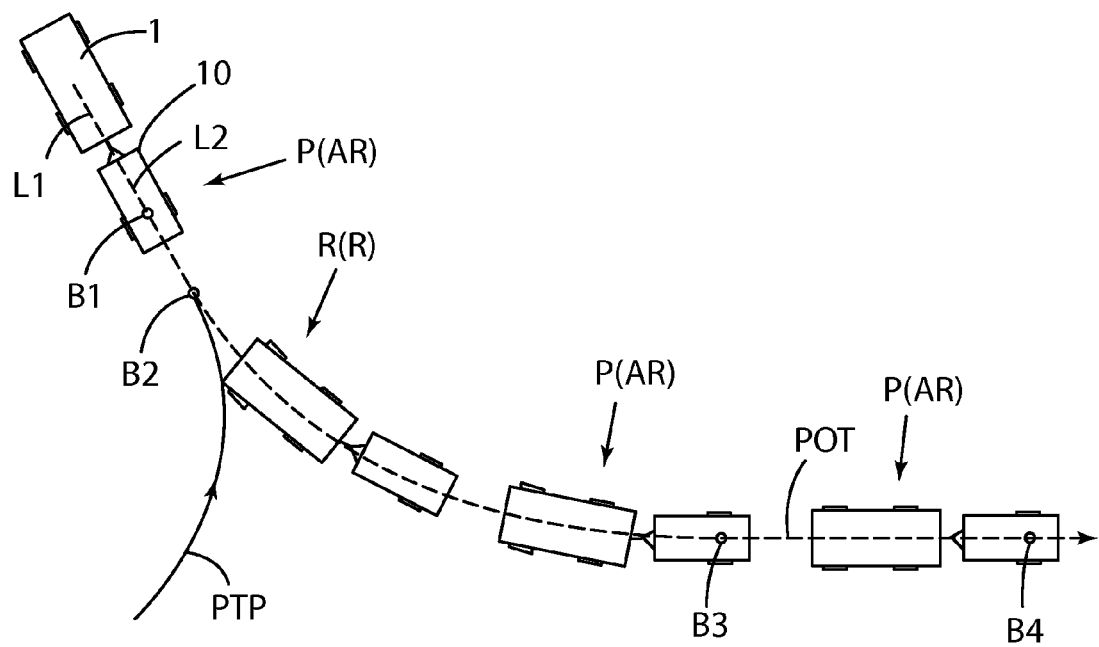
FIG. 3 is a schematic plan view of a trailer backup sequence.

Referring now to FIGS. 2 and 3, an example of using the trailer backup steering input apparatus 125 for dictating a curvature of a path of travel (POT) of a trailer (i.e., the trailer 10 shown in FIG. 1) while backing-up the trailer with a vehicle (i.e., the vehicle 1 in FIGS. 1 and 2) is shown. In preparation of backing-up the trailer 10, the driver of the vehicle 1 drives the vehicle 1 forward along a pull-thru path (PTP) to position the vehicle 1 and trailer 10 at a first backup position B1. In the first backup position B1, the vehicle 1 and trailer 10 are longitudinally aligned with each other such that a longitudinal centerline axis L1 of the vehicle 1 is aligned with (e.g., parallel with or coincidental with) a longitudinal centerline axis L2 of the trailer 10. It is disclosed herein that such alignment of the longitudinal axes L1, L2 at the onset of an instance of trailer backup functionality is not a requirement for operability of a trailer backup assist system configured in accordance with the disclosed subject matter.

After activating the trailer backup assist system 105 (e.g., before, after, or during the pull-thru sequence), the driver begins to back the trailer 10 by reversing the vehicle 1 from the first backup position B1. So long as the knob 170 of the trailer backup steering input apparatus 125 remains in the at-rest position P(AR), the trailer backup assist system 105 will steer the vehicle 1 as necessary for causing the trailer 10 to be backed along a substantially straight path of travel as defined by the longitudinal centerline axis L2 of the trailer 10 at the time when backing-up of the trailer 10 began. When the trailer reaches the second backup position B2, the driver rotates the knob 170 to command the trailer 10 to be steered to the right (i.e., a knob position R(R) clockwise rotation). Accordingly, the trailer backup assist system 105 will steer the vehicle 1 for causing the trailer 10 to be steered to the right as a function of an amount of rotation of the knob 170 with respect to the at-rest position P(AR), a rate of movement of the knob 170, and/or a direction of movement of the knob 170 with respect to the at-rest position P(AR). Similarly, the trailer 10 can be commanded to steer to the left by rotating the knob 170 to the left. When the trailer reaches backup position B3, the driver allows the knob 170 to return to the at-rest position P(AR) thereby causing the trailer backup assist system 105 to steer the vehicle 1 as necessary for causing the trailer 10 to be backed along a substantially straight path of travel as defined by the longitudinal centerline axis L2 of the trailer 10 at the time when the knob 170 was returned to the at-rest position P(AR). Thereafter, the trailer backup assist system 105 steers the vehicle 1 as necessary for causing the trailer 10 to be backed along this substantially straight path to the fourth backup position B4. In this regard, arcuate portions of a path of travel POT of the trailer 10 are dictated by rotation of the knob 170 and straight portions of the path of travel POT are dictated by an orientation of the centerline longitudinal axis L2 of the trailer when the knob 170 is in/returned to the at-rest position P(AR).

In order to activate the trailer backup assist system described above in FIGS. 1-3, the driver interacts with the trailer backup assist system and the trailer backup assist system interacts with the vehicle environment. The trailer backup assist system automatically steers as the driver reverses the vehicle. As discussed above, the driver controls the trailer trajectory by using an auxiliary steering input feature such as a steering knob to input an operator steering request corresponding to a desired trailer path/curvature. The trailer backup assist algorithm determines the vehicle steering angle to achieve the desired trailer curvature, and the driver controls the throttle and brake while the trailer backup assist system controls the steering. Alternatively, the trailer backup assist system 105 may be configured to steer the front wheels 306 (FIG. 5) at a steering angle δ that is directly (e.g. linearly) proportional to the user steering request (i.e. angle of knob 170). As discussed in more detail below, the trailer backup assist system 105 may be configured to "override" an operator steering request such that the actual steering angle δ is selected/determined by the trailer backup assist system to avoid obstacles or other such unacceptable trailer backup conditions. This override may be based, at least in part, on topographical data or the like as discussed below in connection with FIGS. 9 and 10.

Figure 4:
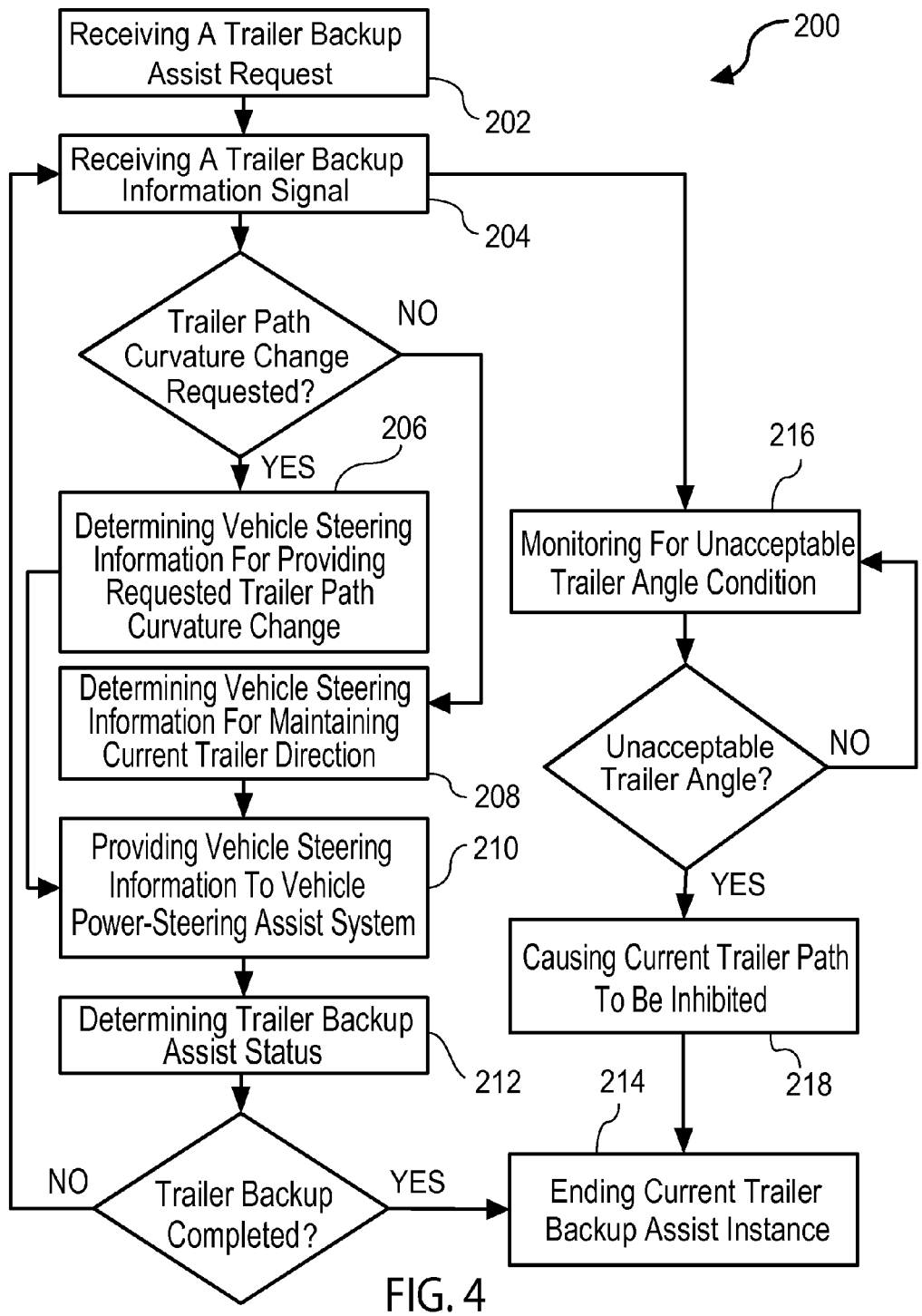
FIG. 4 shows a method for implementing trailer backup assist functionality.

FIG. 4 shows a method 200 for implementing trailer backup assist functionality in accordance with one embodiment. In a preferred embodiment, the method 200 for implementing trailer backup assist functionality can be carried out using the trailer backup assist architecture discussed above in reference to the vehicle 1 and trailer 10 of FIG. 1. Accordingly, trailer steering information is provided through use of an auxiliary steering input feature such as the knob 170 discussed above in connection with FIG. 2.

An operation 202 is performed for receiving a trailer backup assist request. Examples of receiving the trailer backup assist request include activating the trailer backup assist system and providing confirmation that the vehicle and trailer are ready to be backed. After receiving a trailer backup assist request (i.e., while the vehicle is being reversed), an operation 204 is performed for receiving a trailer backup information signal. Examples of information carried by the trailer backup information signal include, but are not limited to, information from the trailer backup steering input apparatus 125, information from the hitch angle detection apparatus 130, information from the power steering assist control module 135, information from the brake system control module 145, and information from the powertrain control module 150. It is disclosed herein that information from the trailer backup steering input apparatus 125 preferably includes trailer path curvature information characterizing a desired curvature for the path of travel of the trailer, such as provided by the trailer backup steering input apparatus 125 discussed above in reference to FIGS. 1 and 2. In this manner, the operation 204 for receiving the trailer backup information signal can include receiving trailer path curvature information characterizing the desired curvature for the path of travel of the trailer. As discussed below, operation 204 is a "fork" operation and operation 214 is a "join" operation showing parallel operations.

If the trailer backup information signal indicates that a change in steering angle δ and curvature of the trailer's path of travel is requested (i.e., commanded via the knob 170), an operation 206 is performed for determining vehicle steering information for providing the requested change in curvature of the trailer's path of travel. Otherwise, an operation 208 is performed for determining vehicle steering information for maintaining a current straight-line heading of the trailer (i.e., as defined by the longitudinal centerline axis of the trailer). Thereafter, an operation 210 is performed for providing the vehicle steering information to a power steering assist system of the vehicle, followed by an operation 212 being performed for determining the trailer backup assist status. If it is determined that trailer backup is complete, an operation 214 is performed for ending the current trailer backup assist instance. Otherwise the method 200 returns to the operation 204 for receiving trailer backup information. Preferably, the operation for receiving the trailer backup information signal, determining the vehicle steering information, providing the vehicle steering information, and determining the trailer backup assist status are performed in a monitoring fashion (e.g., at a high rate of speed of a digital data processing device). Accordingly, unless it is determined that reversing of the vehicle for backing-up the trailer is completed (e.g., due to the vehicle having been successfully backed to a desired location during a trailer backup assist instance, the vehicle having to be pulled forward to begin another trailer backup assist instance, etc.), the method 200 will continually be performing the operations for receiving the trailer backup information signal, determining the vehicle steering information, providing the vehicle steering information, and determining the trailer backup assist status.

It is disclosed herein that the operation 206 for determining vehicle steering information for providing the requested change in steering angle δ curvature of the trailer's path of travel preferably includes determining vehicle steering information as a function of trailer path curvature information contained within the trailer backup information signal. As will be discussed below in greater detail, determining vehicle steering information can be accomplished through a low order kinematic model defined by the vehicle and the trailer. Through such a model, a relationship between the trailer path curvature and commanded steering angles of steered wheels of the vehicle can be generated for determining steering angle changes of the steered wheels for achieving a specified trailer path curvature. In this manner, the operation 206 for determining vehicle steering information can be configured for generating information necessary for providing trailer path curvature control in accordance with the disclosed subject matter.

In some embodiments of the disclosed subject matter, the operation 210 for providing the vehicle steering information to the power steering assist system of the vehicle causes the steering system to generate a corresponding steering command as a function of the vehicle steering information. The steering command is interpretable by the steering system and is configured for causing the steering system to move steered wheels of the steering system for achieving a steered angle as specified by the vehicle steering information. Alternatively, the curvature command signal generated by knob 170 can be utilized as an input whereby the steering wheel angle command is generated by a controller, module or computer external to the steering system (e.g., a trailer backup assist control module) and provided to the steering system.

In parallel with performing the operations for receiving the trailer backup information signal, determining the vehicle steering information, providing the vehicle steering information, and determining the trailer backup assist status, the method 200 performs an operation 216 for monitoring the trailer backup information for determining if an unacceptable trailer backup condition exists. Examples of such monitoring include, but are not limited to assessing a hitch angle to determine if a hitch angle threshold (i.e. maximum allowable hitch angle) is exceeded, assessing a backup speed to determine if a backup speed threshold (i.e. maximum allowable backup speed) is exceeded, assessing vehicle steering angle to determine if a vehicle steering angle threshold (i.e. maximum allowable steering angle) is exceeded, assessing other operating parameters (e.g., vehicle longitudinal acceleration, throttle pedal demand rate and hitch angle rate) for determining if a respective threshold (maximum allowable) value is exceeded, and the like. As discussed in more detail below in connection with FIGS. 9 and 10, the threshold (maximum allowable) operating parameters may be determined, at least in part, utilizing surface slope data or other topographical data.

Backup speed can be determined from wheel speed information obtained from one or more wheel speed sensors of the vehicle. If it is determined that an unacceptable trailer backup condition exists, an operation 218 is performed for causing the current path of travel of the trailer 10 to be inhibited (e.g., stopping motion of the vehicle), followed by the operation 214 being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable hitch angle condition is impending or approaching. In one example, if such feedback results in the unacceptable hitch angle condition being remedied prior to achieving a critical condition, the method can continue with providing trailer backup assist functionality in accordance with operations 204-212. Otherwise, the method can proceed to operation 214 for ending the current trailer backup assist instance. In conjunction with performing the operation 214 for ending the current trailer backup assist instance, an operation can be performed to override operator speed and/or steering requests to control movement of the vehicle to correct or limit a jackknife condition (e.g., steering the vehicle, decelerating the vehicle, limiting magnitude and/or rate of driver requested trailer curvature input, limiting magnitude and/or rate of the steering command, and/or the like to preclude the hitch angle from being exceeded).

Turning now to a discussion of a kinematic model used to calculate a relationship between a curvature of a path of travel of a trailer and the steering angle of a vehicle towing the trailer, a low order kinematic model can be desirable for a trailer backup assist system configured in accordance with some embodiments. To achieve such a low order kinematic model, certain assumptions are made with regard to parameters associated with the vehicle/trailer system. Examples of such assumptions include, but are not limited to, the trailer being backed by the vehicle at a relatively low speed, wheels of the vehicle and the trailer having negligible (e.g., no) slip, tires of the vehicle having negligible (e.g., no) lateral compliance, tires of the vehicle and the trailer having negligible (e.g., no) deformation, actuator dynamics of the vehicle being negligible, the vehicle and the trailer exhibiting negligible (e.g., no) roll or pitch motions.

As discussed in more detail below, the kinematic model may alternatively take into account roll and pitch, and may also take into account surface slope and/or other topographical data. It will be understood that the trailer backup control system may also utilize empirical data in conjunction with a curve fitting algorithm or the like to determine a predicted trailer motion based on operating conditions and/or topographical data. Thus, a kinematic model, empirical data, and/or a combination of kinematic modeling and empirical data may be utilized in connection with data from on board sensors and/or topographical data to predict trailer motion.

Figure 5:
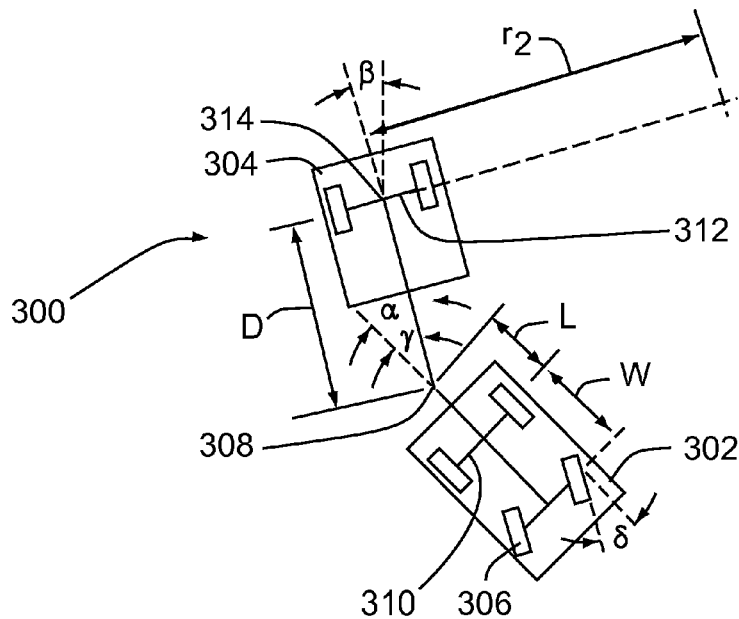
FIG. 5 is a diagrammatic plan view of a kinematic vehicle/trailer model.

As shown in FIG. 5, for a system defined by a vehicle 302 and a trailer 304, the kinematic model 300 is based on various parameters associated with the vehicle 302 and the trailer 304. These kinematic model parameters include:

δ: steering angle at steered front wheels 306 of the vehicle 302;
α: yaw angle of the vehicle 302;
β: yaw angle of the trailer 304;
γ: hitch or trailer angle (γ=β−α);
W: wheel base of the vehicle 302;
L: length between hitch point 308 and rear axle 310 of the vehicle 302;
D: length between hitch point 308 and axle length 312 of the trailer 304 (axle length 312 may be an effective, or equivalent, axle length for a trailer having a multiple axle configuration; and
$r_2$: curvature radius for the trailer 304.

The kinematic model 300 of FIG. 5 reveals a relationship between trailer path radius of curvature $r_2$ at the midpoint 314 of an axle 312 of the trailer 304, steering angle δ of the steered wheels 306 of the vehicle 302, and the hitch angle γ. As shown in the equation below, this relationship can be expressed to provide the trailer path curvature $\kappa_2$ such that, if γ is given, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2}$$
$$= \frac{\dot{\beta}}{\dot{\eta}}$$
$$= \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

Or, this relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain kinematic model parameters (e.g., D, W and L) are constant and assumed known. V is the vehicle longitudinal speed and g is the acceleration due to gravity. K is a speed dependent parameter which when set to zero makes the calculation of steering angle independent of vehicle speed. For example, vehicle-specific kinematic model parameters can be predefined in an electronic control system of a vehicle and trailer-specific kinematic model parameters can be inputted by a driver of the vehicle. Trailer path curvature $\kappa_2$ is determined from the driver input via a trailer backup steering input apparatus. Through the use of the equation for providing steering angle, a corresponding steering command can be generated for controlling a steering system (e.g., an actuator thereof) of the vehicle.

Figure 6:
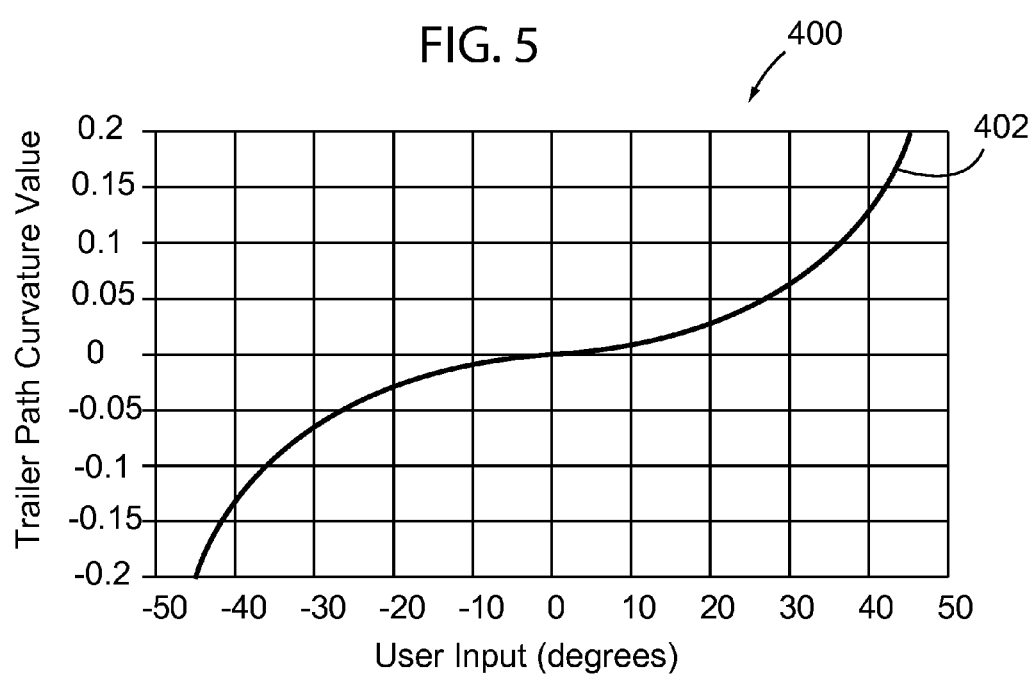
FIG. 6 is a graph showing an example of a trailer path curvature function plot for a rotary-type trailer backup steering input apparatus.

FIG. 6 shown an example of a trailer path curvature function plot 400 for a rotary-type trailer backup steering input apparatus (e.g., the trailer backup steering input apparatus 125 discussed above in reference to FIGS. 1 and 2). A value representing trailer path curvature command signal (e.g., trailer path curvature κ2) is provided as an output signal from the rotary-type trailer backup steering input apparatus as a function of user input movement. In this example, a curve 402 specifying trailer path curvature relative to user input (e.g., amount of rotation) at a rotary input device (e.g., a knob 170) is defined by a cubic function. However, a skilled person will appreciate that embodiments of the disclosed subject matter are not limited to any particular function between a magnitude and/or rate of input at a trailer backup steering input apparatus (e.g., knob rotation) and a resulting trailer path curvature value.

Referring to FIG. 5, in preferred embodiments of the disclosed subject matter, it is desirable to limit the potential for the vehicle 302 and the trailer 304 to attain a jackknife angle (i.e., the vehicle/trailer system achieving a jackknife condition). A jackknife angle γ(j) refers to a hitch angle γ that while backing-up cannot be overcome by the maximum steering input for a vehicle such as, for example, the steered front wheels 306 of the vehicle 302 being moved to a maximum steered angle δ at a maximum rate of steering angle change. The jackknife angle γ(j) is a function of a maximum wheel angle for the steered wheel 306 of the vehicle 302, the wheel base W of the vehicle 302, the distance L between hitch point 308 and the rear axle 310 of the vehicle 302, and the length D between the hitch point 308 and the effective axle 312 of the trailer 304 when the trailer has multiple axles. The effective axle 312 may be the actual axle for a single axle trailer or an effective axle location for a trailer with multiple axles. When the hitch angle γ for the vehicle 302 and the trailer 304 achieves or exceeds the jackknife angle γ(j), the vehicle 302 must be pulled forward to reduce the hitch angle γ. Thus, for limiting the potential for a vehicle/trailer system attaining a jackknife angle, it is preferable to control the yaw angle of the trailer while keeping the hitch angle of the vehicle/trailer system relatively small.

Figure 7:
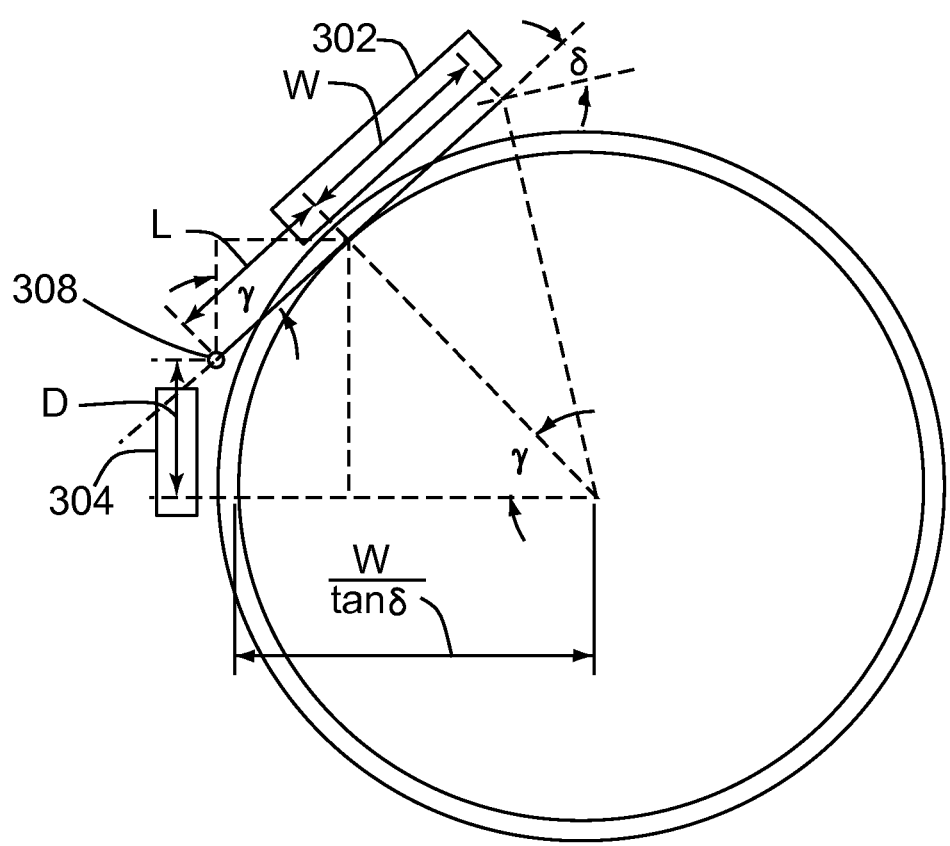
FIG. 7 is a diagrammatic plan view showing a relationship between a hitch angle and steered angle as it relates to determining a jackknife angle for a vehicle/trailer system in reverse or backing-up.

Referring to FIGS. 5 and 7, a steering angle limit for the steered front wheels 306 requires that the hitch angle γ cannot exceed the jackknife angle γ(j), which is also referred to as a critical hitch angle. Thus, under the limitation that the hitch angle γ cannot exceed the jackknife angle γ(j), the jackknife angle γ(j) is the hitch angle γ that maintains a circular motion for the vehicle/trailer system when the steered wheels 306 are at a maximum steering angle δ(max). The steering angle for circular motion with hitch angle is defined by the following equation.

$$\tan\delta_{max} = \frac{w\sin\gamma_{max}}{D + L\cos\gamma_{max}}$$

Solving the above equation for hitch angle allows jackknife angle γ(j) to be determined. This solution, which is shown in the following equation, can be used in implementing trailer backup assist functionality in accordance with the disclosed subject matter for monitoring hitch angle in relation to jackknife angle.

$$\cos\bar{\gamma} = \frac{-b \pm \sqrt{b^2 - 4ac}}{2a}$$

where,
$a = L^2 \tan^2 \delta(\max) + W^2$;
$b = 2 LD \tan^2 \delta(\max)$; and
$c = D^2 \tan^2 \delta(\max) - W^2$.

In certain instances of backing-up a trailer, a jackknife enabling condition can arise based on current operating parameters of a vehicle in combination with a corresponding hitch angle. This condition can be indicated when one or more specified vehicle operating thresholds are met while a particular hitch angle is present. For example, although the particular hitch angle is not currently at the jackknife angle for the vehicle and attached trailer, certain vehicle operating parameters can lead to a rapid (e.g., uncontrolled) transition of the hitch angle to the jackknife angle for a current commanded trailer path curvature and/or can reduce an ability to steer the trailer away from the jackknife angle. One reason for a jackknife enabling condition is that trailer curvature control mechanisms (e.g., those in accordance with the disclosed subject matter) generally calculate steering commands at an instantaneous point in time during backing-up of a trailer. However, these calculations will typically not account for lag in the steering control system of the vehicle (e.g., lag in a steering EPAS controller). Another reason for the jackknife enabling condition is that trailer curvature control mechanisms generally exhibit reduced steering sensitivity and/or effectiveness when the vehicle is at relatively high speeds and/or when undergoing relatively high acceleration.

Figure 8:
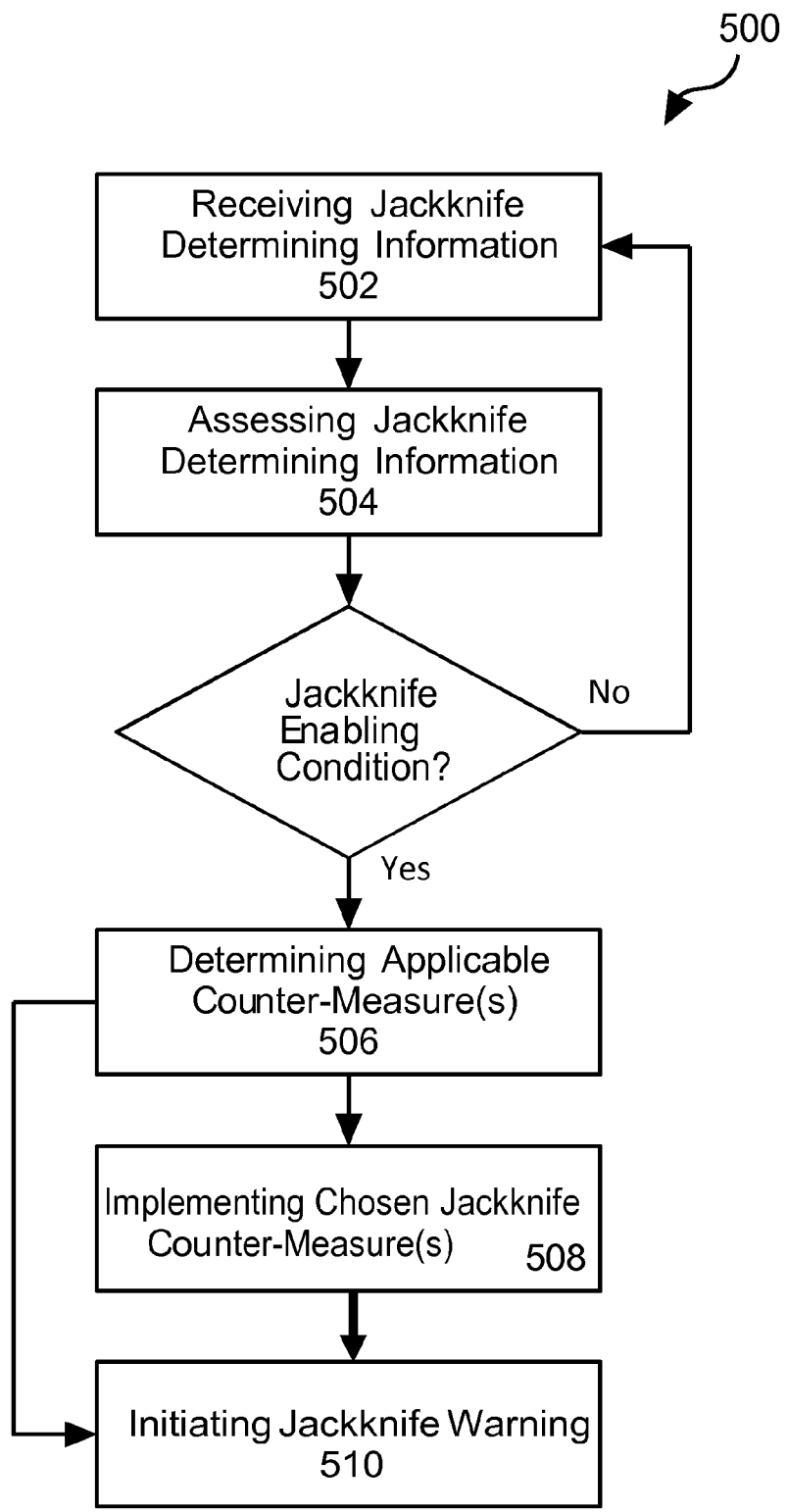
FIG. 8 shows a method for implementing jackknife countermeasures functionality.

FIG. 8 shows a method 500 for implementing jackknife countermeasures functionality in accordance with an embodiment of the disclosed subject matter for a vehicle and attached trailer. Trailer backup assist functionality in accordance with the disclosed subject matter can include jackknife countermeasures functionality. Alternatively, jackknife countermeasures functionality in accordance with one embodiment can be implemented separately from other aspects of trailer backup assist functionality.

The method 500 begins when operation 502 is performed for receiving jackknife determining information characterizing a jackknife enabling condition of the vehicle-trailer combination at a particular point in time (e.g., at the point in time when the jackknife determining information was sampled). Examples of the jackknife determining information includes, but are not limited to, information characterizing a hitch angle, information characterizing a vehicle accelerator pedal transient state, information characterizing a speed of the vehicle, information characterizing longitudinal acceleration of the vehicle, information characterizing a brake torque being applied by a brake system of the vehicle, information characterizing a powertrain torque being applied to driven wheels of the vehicle, and information characterizing the magnitude and rate of driver requested trailer curvature.

The operation 502 for receiving jackknife determining information can be the first operation in a sampling process where jackknife determining information is sampled upon initiation of an instance of implementing jackknife countermeasures functionality. In this regard, jackknife determining information would be continually monitored such as, for example, by an electronic control unit (ECU) that carries out trailer backup assist (TBA) functionality. As discussed above in reference to FIG. 5, a kinematic model representation of the vehicle and the trailer can be used to determine a jackknife angle for the vehicle-trailer combination. However, the disclosed subject matter is not unnecessarily limited to any specific approach for determining the jackknife angle.

After receiving the jackknife determining information, an operation 504 is performed for assessing the jackknife determining information for determining if the vehicle-trailer combination attained the jackknife enabling condition at the particular point in time. The objective of the operation 504 for assessing the jackknife determining information is determining if a jackknife enabling condition has been attained at the point in time defined by the jackknife determining information. If it is determined that a jackknife enabling condition is not present at the particular point in time, the method 500 returns to the operation 502 for receiving another instance of the jackknife determining information. If it is determined that a jackknife enabling condition is present at the particular point in time, an operation 506 is performed for determining an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still other embodiment, a predefined countermeasure or predefined set of countermeasures may be the applicable countermeasure(s).

The objective of a countermeasure in the context of the disclosed subject matter (i.e., a jackknife reduction countermeasure) is to alleviate a jackknife enabling condition. To this end, such a countermeasure can be configured to alleviate the jackknife enabling condition using a variety of different strategies. In a vehicle speed sensitive countermeasure strategy, actions taken for alleviating the jackknife enabling condition can include overriding and/or limiting driver requested trailer radius of curvature (e.g., being requested via a trailer backup steering input apparatus configured in accordance with the disclosed subject matter) as a function of vehicle speed (e.g., via a lookup table correlating radius of curvature limits to vehicle speed as shown in FIG. 6). In a countermeasure strategy where trailer curvature requests are limited as a function of speed and driver curvature command transient rates, actions taken for alleviating the jackknife enabling condition can include rate limiting trailer curvature command transients as requested by a driver above a predefined vehicle speed whereas, under the predefined vehicle speed, the as-requested trailer curvature are not rate limited.

In a torque limiting countermeasure strategy, actions taken for alleviating the jackknife enabling condition can include application of full available powertrain torque being inhibited when the jackknife enabling condition is present while the vehicle is above a predefined speed and application of full available powertrain torque being allowed when the vehicle speed is reduced below the predefined speed while in the torque inhibiting mode. As opposed to a fixed predefined speed, the torque limiting countermeasure strategy can utilize a speed threshold that is a function of hitch angle (i.e., speed threshold inversely proportional to hitch angle acuteness). In a driver accelerator pedal transient detection countermeasure strategy, actions taken for alleviating the jackknife enabling condition can include overriding and/or limiting driver requested trailer radius of curvature as a function of transient accelerator pedal requests (e.g., requested trailer radius of curvature limited when a large accelerator pedal transient is detected). In a hitch angle rate sensitive countermeasure strategy, actions taken for alleviating the jackknife enabling condition can include using hitch angle rate in a predefined or calculated mapping with current hitch angle position to limit driver requested trailer radius of curvature. Accordingly, in view of the disclosures made herein, a skilled person will appreciate that embodiments of the disclosed subject matter are not unnecessarily limited to a countermeasure strategy of any particular configuration.

As disclosed above, implementation of trailer backup assist functionality in accordance with the disclosed subject matter can utilize a kinematic model for determining steering control information, jackknife enabling conditions, and jackknife angle. Such a kinematic model has many parameters than can influence trailer curvature control effectiveness. Examples of these parameters include, but are not limited to, the vehicle wheelbase, understeer gradient gain, vehicle track width, maximum steer angle at the vehicle front wheels, minimum turning radius of vehicle, maximum steering rate able to be commanded by the steering system, hitch ball to trailer axle length, and vehicle rear axle to hitch ball length. Sensitivity analysis for a given kinematic model can be used to provide an understanding (e.g., sensitivity) of the relationships between such parameters, thereby providing information necessary for improving curvature control performance and for reducing the potential for jackknife enabling conditions. For example, through an understanding of the sensitivity of the parameters of a kinematic model, scaling factors can be used with speed dependent jackknife countermeasures to reduce jackknife potential (e.g., for special applications such as short wheelbase conditions).

Still referring to FIG. 8, after determining the applicable countermeasure(s), an operation 508 is performed for implementing the chosen jackknife countermeasure(s) and an operation 510 is performed for initiating a jackknife warning. As discussed above in regard to countermeasure strategies, implementing the jackknife countermeasure(s) can include commanding a speed controlling system of the vehicle to transition to an altered state of operation in which a speed of the vehicle is reduced, commanding the steering control system of the vehicle to transition to an altered state of operation in which a radius of curvature of a path of the trailer is increased, command the steering control system of the vehicle to transition to an altered state of operation in which a decrease in the radius of the curvature of the path of the trailer is inhibited, commanding a brake control system of the vehicle to apply brake torque to reduce vehicle speed/inhibit vehicle acceleration, and/or commanding a powertrain control system of the vehicle to inhibit full available powertrain torque from being delivered to driven wheels of the vehicle until another jackknife enabling parameter (e.g., vehicle speed) is below a defined threshold.

In certain embodiments of the disclosed subject matter, the jackknife warning is provided to the driver using at least one vehicle control system through which the jackknife countermeasure is implemented. Speed reduction, in addition to applying the brakes, can be accomplished by any number of means such as, for example, limiting throttle inputs (e.g., via a terrain management feature) and/or transitioning a transmission to a reverse low gear if the vehicle is equipped with a multi-range reverse gear transmission. Examples of such system-specific warning approach include, but are not limited to, providing a warning through an accelerator pedal of the vehicle (e.g., via haptic feedback) if the countermeasure includes limiting speed of the vehicle and/or providing a warning through an input element (e.g., knob) of a trailer backup steering input apparatus of the vehicle (e.g., via haptic feedback if the countermeasure includes limiting driver requested trailer radius of curvature), through haptic seat vibration warning, through a visual warning (e.g., through a visual display apparatus of the towing vehicle) and/or through audible warnings (e.g., through an audio output apparatus of the towing vehicle), or the like.

One embodiment of utilizing warnings relating to vehicle speed as it relates to onset or presence of a jackknife enabling condition includes implementation of a dual stage warning. For example, when a backing-up speed of the vehicle increases sufficiently for causing a speed of the vehicle to reach a lower (i.e., first) speed threshold during backing-up of the trailer, a driver of the vehicle would be provided with a first warning indication (e.g., via haptic, audible, and/or visual means as implemented by the trailer backup assist system) for informing the driver that there is the need to reduce the speed of the vehicle to alleviate or preclude the jackknife enabling condition. If the driver does not correspondingly respond by causing a speed of the vehicle to be reduced (or not to further increase) and the vehicle continues to gain speed such that it passes a higher (i.e., a second) speed threshold, the driver of the vehicle would be provided with a second warning indication (e.g., a more severe haptic, audible, and/or visual means as implemented by the trailer backup assist system) for informing the driver that there is an immediate need to reduce the speed of the vehicle to alleviate or preclude the jackknife enabling condition. The first and/or the second speed indication warnings can be implemented in conjunction with a respective speed limiting countermeasure measures (e.g., the trailer backup assist system causing activation of a brake system of the vehicle and/or reducing a throttle position of the vehicle).

Figure 9:
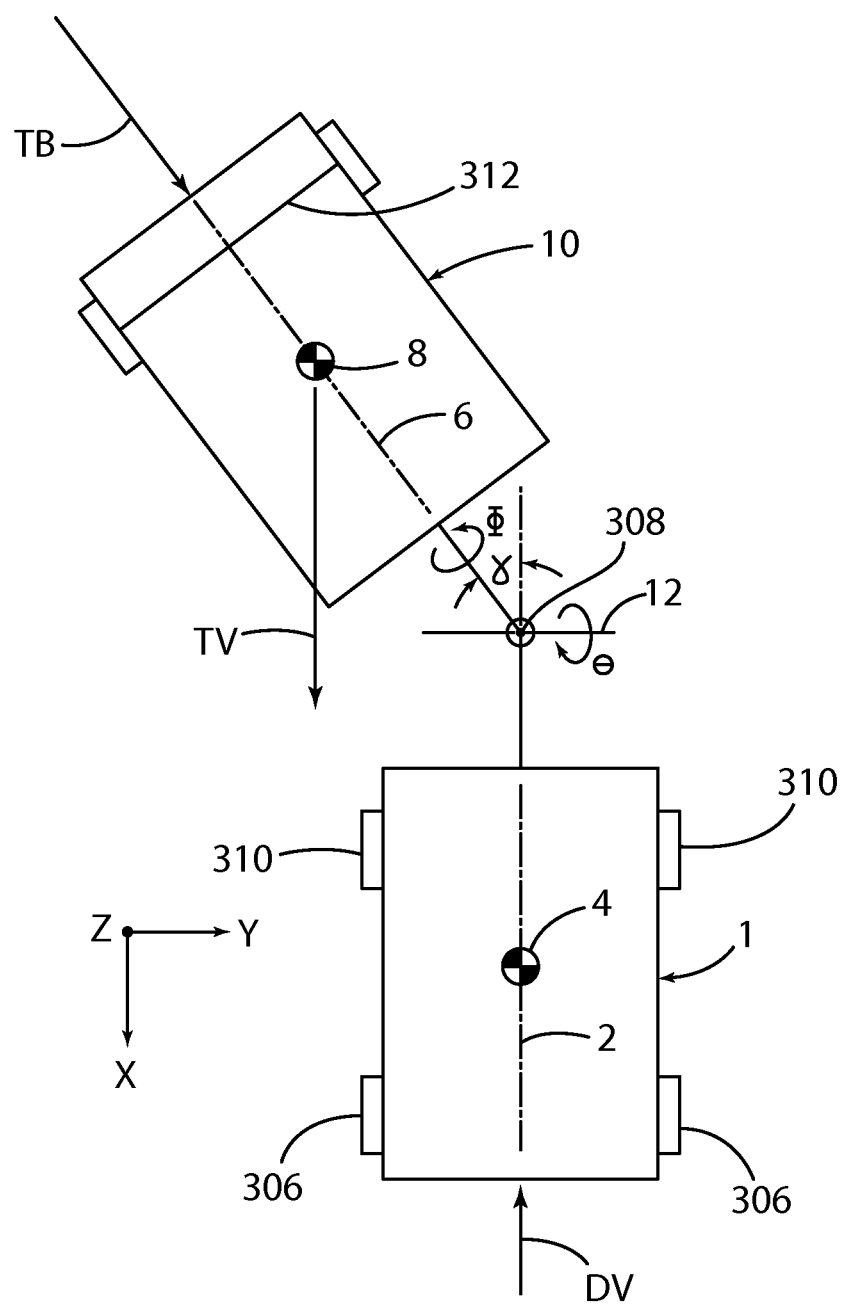
FIG. 9 is a diagramic plan view of a vehicle and trailer backing-up on a sloped surface.

With further reference to FIG. 9, when vehicle 1 and trailer 10 are backing-up a hill, vehicle 1 generates a force acting in the direction of the vehicle drive vector "DV" that is opposite the X axis of the vehicle. The vehicle drive vector DV acts along a vehicle centerline 2 that extends through the vehicle center of gravity 4. Trailer 10 generates a force vector "TV" that acts on the trailer center of gravity 8. The trailer center of gravity 8 is disposed on the trailer centerline 6. In the illustrated example, the vehicle 1 is backing up directly up a hill, such that the force vector TV of trailer 10 due to gravity is parallel to the vehicle centerline 2. However, if vehicle 1 is backing-up down a hill having a slope that is directly opposite the X axis of the vehicle, the trailer force vector TV will act in a direction that is opposite the direction shown in FIG. 9. If the vehicle 1 and trailer 10 are backing-up or down a hill at an angle, the trailer force vector TV will normally not be parallel to the vehicle centerline 2. For example, if vehicle 1 and trailer 10 are backing-up on a surface that is sloped transverse to the vehicle's X axis, the vector TV will be normal to the vehicle centerline 2. In the illustrated example, trailer 10 includes trailer brakes that generate a trailer brake vector "TV" acting through trailer centerline 6. It will be understood that trailer 10 may or may not include brakes, such that the braking force shown by the vector TV may or may not be present.

As discussed above, vehicle 1 and trailer 10 are pivotably connected at a trailer hitch point 308, and trailer 10 defines a hitch angle γ. If the trailer 10 is on a surface that is sloped at an angle relative to a surface supporting vehicle 1, trailer 10 may roll relative to vehicle 1 at a roll angle Φ. Also, if vehicle 1 and trailer 10 are on surfaces having different slope angles, the trailer 10 may also define a pitch angle θ about a horizontal line 12 extending through hitch point 308. Line 12 is parallel to the Y axis of the vehicle.

When reversing/backing-up with a trailer 10, the road topography will cause the response of the trailer 10 to steering input and/or other inputs to change as trailer 10 tilts and pitches relative to the vehicle 1. The response of the trailer 10 to inputs may also change relative to responses on flat, level surfaces when the vehicle 1 and trailer 10 are on a flat but sloped surface that does not result in tilts and pitches of trailer 10 relative to vehicle 1. For example, when the trailer 10 is moving uphill, the risk of jackknife increases under these conditions. Also, road topography and surface conditions also affect the trailer response to speed control as provided, for example, by brake system control module 145 and/or powertrain system control module 150 (FIG. 1).

As noted above, when the trailer 10 is being backed up, the road topography causes the response of the trailer 10 to steering input to change as it tilts and pitches relative to the vehicle 1. For example, when the trailer 10 is moving up hill during backing-up operations, the trailer 10 will respond quicker to steering inputs (changes in the steering angle of the steered wheels of vehicle 1) than when trailer 10 is moving down a hill or slope. According to one aspect of the present invention, the trailer backup assist system 105 may be configured to take into account road topography, surface conditions, and the like in generating commands to the brake system control module 145 and/or power train system control module 150 and/or the power steering assist system 115. The trailer backup assist system 105 may be configured to utilize road topography and/or surface conditions to ensure that the trailer 10 travels along a desired path of a user and/or to avoid unacceptable trailer backup conditions such as jackknife conditions, excessive speed, or the like. Still further, the trailer backup assist system 105 may be configured to utilize road topography and/or surface conditions to generate a warning or alert to a vehicle operator that an unacceptable trailer backup condition (e.g. jackknife condition) is imminent.

Figure 10:
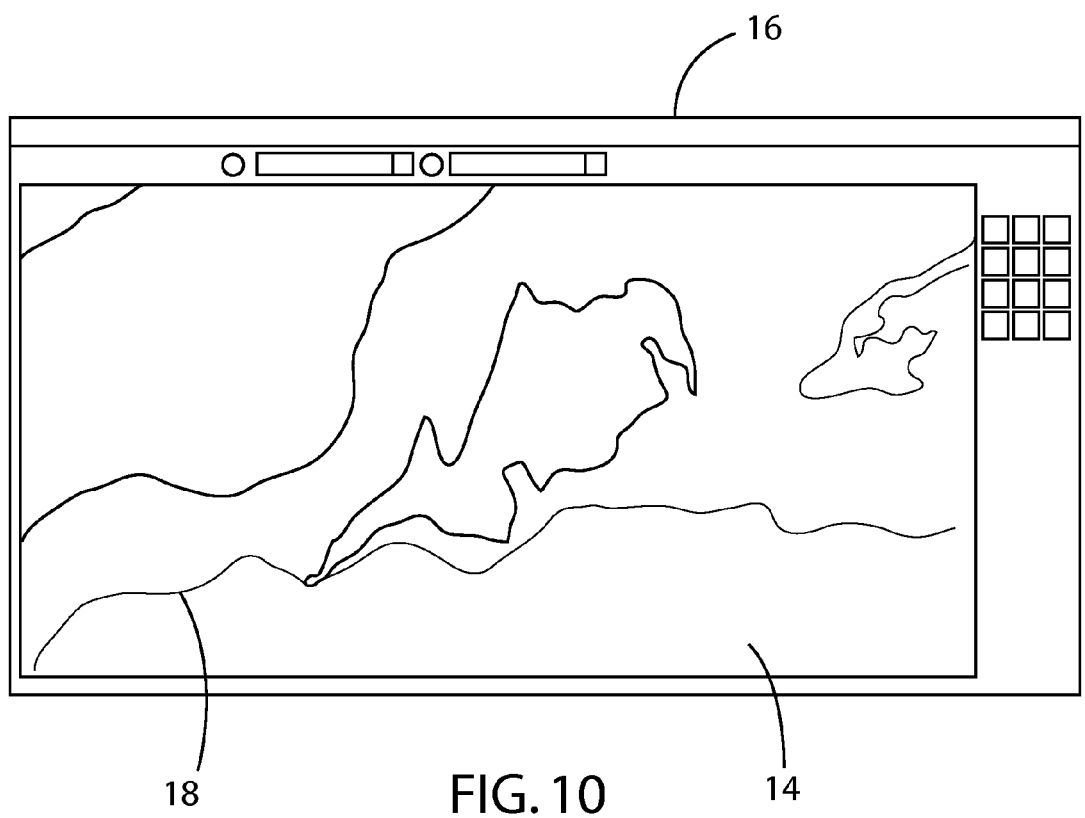
FIG. 10 is a view of a display showing topographical map data.

With further reference to FIG. 10, a topographical map 14 comprises topographical data that may be displayed on a display screen 16. The topographical map 14 may include topographical lines 18 and other topographical data such as the locations of buildings, fences, poles, curbs, ravines, lakes, rivers, etc. The display screen 16 may be mounted in vehicle 1 (e.g. adjacent knob 170 (FIG. 2)) on a center console. Alternatively, the topographical data utilized to form topographical map 14 may be stored in trailer backup assist system 105 without displaying the topographical information on a screen 16. Thus, it will be understood that the topographical data does not necessarily need to be displayed on a display screen 16. Also, at least some of the topographical data may be stored in a smart phone or the like that may be configured to communicate with trailer backup assist system 105 via a blue tooth or other wireless data connection. Also, trailer backup assist system 105 may optionally include a transmitter and receiver (not shown) that permits the trailer backup assist system 105 to communicate wirelessly utilizing cell towers or other wireless communication systems whereby the trailer backup assist system 105 can wirelessly receive topographical data from a remote source. The vehicle 1 may optionally include a GPS receiver whereby the trailer backup assist system 105 determines the location of the vehicle 1, and receives topographical information for the geographical region within which the vehicle 1 and trailer 10 are disposed. The trailer backup assist system 105 may be configured to utilize GPS data to determine the location of vehicle 1 on the topographical map 14. Still further, vehicle 1 may include a compass or other device to determine the orientation of vehicle 1 relative to the topographical map data of map 14.

The topographical map data may include slope data and/or road surface conditions. For example, if a particular road is paved or gravel, the topographical map data may include information concerning the road surfaces. Furthermore, the trailer backup assist system 105 may be configured to utilize data (e.g. weather data) obtained from a remote source to predict road surface conditions. For example, if available weather data shows that it has been raining in the area, trailer backup assist system 105 may be configured to determine that the road surface is wet, and this road surface information can be utilized in controlling backup operations. Road surface conditions can also be determined/estimated utilizing sensors on board vehicle 1. For example, if vehicle 1 includes rain sensors utilized to control windshield wipers, this data can be utilized by trailer backup assist system 105 to determine if the road surface is likely to be wet. Furthermore, vehicle 1 may include a temperature sensor. If the temperature sensor indicates that the temperature is near or below 32°, this data may be utilized to determine if ice or snow is likely to be present. Still further, data obtained from other on board sensors may also be utilized by the trailer backup assist system 105 to predict/estimate road surface conditions. For example, if vehicle 1 includes an anti-lock brake system (ABS), and/or a traction control system, road surface conditions can also be estimated/predicted utilizing data from these systems. For example, if vehicle 1 has encountered a slippery road surface causing the ABS system to activate within a predefined time period (e.g. 10 minutes) prior to a trailer backing-up operation, this data may be utilized to estimate the probability that the road surface conditions are slippery during backing-up operations.

Also, in addition to topographical road data that can be obtained from a database, vehicle 1 may also include sensors that can be utilized to determine the road surface slope or topography. For example, vehicle 1 may include one or more accelerometers that can be utilized to determine the direction of the gravity vector acting on vehicle 1, and the angle of vehicle 1 relative to the gravity vector can be determined. This angle can then be utilized to determine the slope of the road surface. It will be understood that changes in the orientation of the gravity vector can be utilized to determine the direction of motion of vehicle 1 relative to the slope of the road surface. Also, trailer backup assist system 105 may be configured to utilize a combination of data obtained from sensors on vehicle 1 and topographical map data to determine the road surface slope/topography. Still further, sensors may be positioned on trailer 10 to determine the orientation of trailer 10 relative to a gravity vector to thereby determine the slope of the road surface that is being encountered by trailer 10. Still further, one or more sensors may be utilized to determine the hitch angle γ, roll angle Φ, and/or pitch angle θ of trailer 10 (FIG. 9) relative to vehicle 1. This data may also be utilized to determine the road surface slope/topography.

As discussed above, in use a user rotates knob 170 (FIG. 2) to thereby generate a curvature command signal to the control system. The control system then generates a steering wheel angle command signal to the power steering system that causes the steered wheels to move to a steering angle δ (FIG. 5) corresponding to the steering wheel angle command. The road slope/topographical information may be utilized to adjust how the trailer backup assist system 105 controls the power steering assist system 115. The trailer curvature controller (e.g. programming of trailer backup assist system 105 and/or power steering assist control module 135) can be configured to compensate for surface topography to ensure consistent trailer curvature response across varying surface topography. For example, the control or steering gain can be increased when reversing downhill or traveling in reverse on hard slippery surfaces, and the steering gain can be decreased when the vehicle 1 and trailer 10 are backing-up hill or on deformable surfaces such as mud. Also, the automatic steering function may be configured to adjust the path of the trailer 10 to help avoid driving into an undesirable topographical feature such as a ravine or hill having a slope exceeding a predefined maximum allowable value. Power steering assist system 115 may optionally utilize a proportional-integral-derivative (P.I.D.), controller, and the parameters (gain) of the P.I.D. controller may be adjusted based on road surface topography, traction, and/or other such variables.

When the trailer 10 and vehicle 1 are backing-up, the road topography and surface conditions also affect the response of trailer 10 to brake and power train control inputs. For example, vehicle 1 and trailer 10 may pitch and tilt relative to each other as they travel across different surface grade and camber angles. When the trailer 10 is being backed up a hill, the trailer 10 will de-accelerate quicker when the trailer brakes are actuated relative to when the trailer 10 is backing-up down a hill. The trailer backup assist system 105 may be configured to take into account road grade, camber angles, and road surface conditions when controlling brake system control module 145 and/or power train system control module 150 to compensate for road grade and camber angles so that a consistent speed can be achieved. The topographical data and/or road surface data can be utilized to adjust the gain of the brake system control module 145 along with power train torque output, brake torque output, and/or automatic gear selection to tailor the speed control of the vehicle 1 and trailer 10 based on the orientation of vehicle 1 and trailer 10 relative to the surface topography. Specifically, the torque output may be monitored and modified to help maintain a consistent speed across varying surface conditions, grades and camber angles. If brake system control module 145 is configured to utilize a P.I.D. control, the parameters (gain) of the P.I.D. control can be adjusted based on surface topography, traction, and other variables.

Furthermore, the power train torque output may be limited to help reduce the speed of the vehicle 1 and trailer 10 based on the orientation of each relative to the surface topography. Specifically, the torque output may be monitored and modified to help maintain a consistent speed across varying surface conditions, grades and camber angles. Furthermore, the power train torque output may be limited to help reduce the speed of the vehicle 1 and to reduce the risk of driving across an undesirable topographical feature such as a ravine. The brake torque may be applied to help maintain a consistent speed across varying surface conditions, grades and camber angles. Furthermore, brake torque may be applied to de-accelerate the vehicle to reduce the risk of driving across an undesirable feature such as a ravine. The trailer brake torque output may also be applied independently to the trailer 10 to help maintain a consistent speed across varying surface conditions, grades and camber angles. Furthermore, the trailer brake may be applied to de-accelerate the trailer 10 to reduce the risk of driving across an undesirable surface feature such as a ravine or road surface having a slope that exceeds a predefined maximum allowable slope. Still further, the trailer backup assist system 105 may be configured to cause the transmission to change to Neutral or downshift to facilitate engine braking to reduce the risk of overheating the braking system and to control the speed of the vehicle taking into account road surface conditions and topographical data. The trailer backup assist system 105 may also be configured to take into account longitudinal acceleration to detect a threshold at which an undesirable condition will occur. For example, the undesirable condition may comprise backing-up the vehicle 1 and trailer 10 into a ravine or other obstacle.

The topographical surface data may also be utilized to determine if a jackknife condition is imminent. For example, when trailer 10 is being backed up hill, the risk of a jackknife condition may increase. When backing-up a hill, the vehicle operator may have less time to respond to jackknife warnings. Thus, the jackknife enabling conditions/criteria discussed above may be modified to take into account road topography to more accurately predict (estimate) a jackknife condition when vehicle 1 and/or trailer 10 are on a sloped surface and/or to modify the operator warning/alert timing/criteria. For example, the steps shown in the flow chart of FIG. 8 may take into account the surface conditions and/or surface topography to determine if a jackknife enabling condition is present or is likely to occur shortly. The system may be configured to estimate a time interval until a jackknife condition will occur, and generate a user warning at a predefined estimated time interval prior to the predicted/estimated jackknife condition. Typically, a user warning is generated at smaller hitch angles when the vehicle and trailer are backing-up hill on a sloped surface than when backing-up on a level surface. The user warning may comprise a visual indicator (e.g. light) an audible indicator (e.g. a beep or beeps), or a tactile indicator (e.g. vibrating of knob 170 or other surface). Furthermore, the applicable counter measures 506 may also take into account the road surface conditions and/or topography. The jackknife counter-measures 508 and/or jackknife warning 510 may also take into account topography and/or road conditions as required.

It will be understood that the determination of a jackknife enabling condition may utilize a mathematical model of the vehicle 1 and trailer 10 either by itself and/or in combination with empirical data. For example, various trailers 10 may be tested in connection with a particular vehicle model 1 to determine what measured variables (including surface condition and/or slope) are indicative of a jackknife condition. The trailer backup assist system 105 may be configured to interpolate or otherwise estimate the conditions indicating that a jackknife condition is present or imminent utilizing the empirical data and information concerning a particular trailer 10 that is attached to vehicle 1.

Trailer backup assist system 105 may also be utilized to generate a warning to a vehicle operator with respect to the vehicle speed and/or vehicle direction/steering. For example, if the vehicle speed or acceleration, are approaching predefined maximum allowable values, or if other unacceptable trailer backup conditions (e.g. vehicle direction) are present or imminent, trailer backup system 105 may be configured to provide a visual warning and/or an audible warning and/or a tactile warning. The visual warning or alert may include utilizing the vehicle operator's own smart device such as a cell phone or tablet and/or subsystems in the vehicle such as an illuminated steering wheel or knob, illuminated camera display, heads up display, illuminated mirrors, text or schematic screen that may be utilized with a variety of color, intensity, and blink frequencies to provide feedback to the driver that the trailer backup assist system 105 is overriding an operator input (e.g. brake, throttle, or steering) and/or to help guide the vehicle operator to avoid the unacceptable trailer backup condition. The audible warning or alert may comprise audible tones or voice commands that instruct the vehicle operator how to avoid the unacceptable trailer backup conditions and/or inform the vehicle operator that the trailer backup assist system is overriding one or more operator inputs to avoid an unacceptable trailer backup condition. The tactile warning or alert may comprise steering wheel torque and/or vibrations that assist the vehicle operator in avoiding the unacceptable trailer backup conditions and/or inform the vehicle operator that the trailer backup assist system 105 is overriding one or more operator inputs to avoid an unacceptable trailer backup condition. Other subsystems or devices such as vibrating phones, vibrating tablets, vibrating seats, and the like may also be utilized to provide a tactile warning or alert. Changing the frequencies of the vibration may be used to convey additional information to the vehicle operator concerning the probability of an unacceptable trailer backup condition.

Unacceptable trailer backup conditions may include excessive vehicle speed, a jackknife condition, excessive trailer pitch or roll, excessive acceleration, or the like. Furthermore, the unacceptable trailer backup conditions may comprise obstacles (e.g. buildings or other vehicles) or other topographical features such as ravines or road surfaces having slopes that exceed predefined maximum allowable values. Unacceptable trailer backup conditions may also include loss of traction, excessive jolting/acceleration due to vehicle and/or trailer interacting with bumps (e.g. potholes) or the like on a road surface. The maximum allowable speed, acceleration, and other vehicle operating parameters may be adjusted depending on the road surface conditions. For example, if the road surface is wet, or has reduced traction for other reasons, the maximum allowable speed, hitch angle, or other threshold/allowable vehicle operating parameters may be reduced.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of utilizing surface slope data to alert an operator and/or to control a vehicle having a trailer backup assist system for use in backing up the vehicle when a trailer is connected to the vehicle, wherein the vehicle defines a plurality of vehicle operating parameters, and wherein the vehicle and trailer together encounter at least one predefined problematic operating condition that is to be avoided when the trailer is connected to the vehicle and the vehicle is backing up, and wherein, when backing up, a response of the trailer to changes in the vehicle operating parameters changes due to changes in surface slope encountered by the vehicle and/or the trailer; the method comprising:
providing a trailer backup assist system; and
configuring the trailer backup assist system to utilize surface slope data to provide an alert to an operator if a problematic operating condition is present and/or imminent while the vehicle is backing up with a trailer attached thereto; and/or utilize surface slope data to control at least one vehicle operating parameter while the vehicle is backing up with a trailer attached thereto.

2. The method of claim 1, including:
utilizing a Global Positioning System (GPS) device to obtain a position of the vehicle to determine the surface slope data.

3. The method of claim 1, including:
utilizing a wireless receiver to obtain the surface slope data encountered by the vehicle and/or the trailer.

4. The method of claim 1, including:
providing the vehicle with a sensor;
utilizing data from the sensor to determine the surface slope data.

5. The method of claim 4, wherein:
the sensor detects an angular orientation of the vehicle relative to an orientation of the vehicle on a level surface while the vehicle is backing up with a trailer attached thereto.

6. The method of claim 4, wherein:
the sensor detects at least one of a pitch and a roll angle of the trailer relative to the vehicle while the vehicle is backing up with a trailer attached thereto.

7. The method of claim 1, including:
determining a surface traction condition of a surface on which the vehicle and/or trailer are supported;
utilizing the surface traction condition to control a vehicle operating parameter while the vehicle is backing up with a trailer attached thereto.

8. The method of claim 7, wherein:
the vehicle operating parameter comprises vehicle steering; and including:
generating a steering command for a steering system of the vehicle as a function of the surface traction condition while the vehicle is backing up with a trailer attached thereto.

9. The method of claim 8:
wherein:
the steering command takes the surface traction condition into account to compensate for the surface traction condition while the vehicle is backing up with a trailer attached thereto.

10. The method of claim 7, wherein:
the surface traction condition is determined utilizing one or more sensors on the vehicle while the vehicle is backing up with a trailer attached thereto.

11. The method of claim 10, wherein:
the surface traction condition is determined utilizing information obtained from a remote source using a receiver on the vehicle.

12. The method of claim 1, wherein:
the vehicle includes a steering wheel and a power steering system that changes a steering angle in response to steering command signals;
the trailer backup assist system includes an auxiliary steering input feature that can be operated by a user without turning the steering wheel while the vehicle is backing up with a trailer attached thereto to input user curvature requests corresponding to a desired curvature for a path of travel of a vehicle and trailer during backing of the vehicle and trailer; and
the trailer backup assist system generates steering command signals based on user curvature requests and surface slope data while the vehicle is backing up with a trailer attached thereto.

13. The method of claim 12, wherein:
the trailer backup assist system adjusts the steering command signals based on the surface slope data such that the vehicle and trailer have substantially consistent trailer curvature response across varying surface topography for a given user curvature request.

14. A method of utilizing surface slope data to alert an operator and/or to control a vehicle having a trailer backup assist system for use in backing up the vehicle when a trailer is connected to the vehicle, wherein the vehicle defines a plurality of vehicle operating parameters, and wherein the vehicle and trailer together encounter at least one predefined problematic operating condition that is to be avoided when the trailer is connected to the vehicle and the vehicle is backing up, and wherein, when backing up, a response of the trailer to changes in the vehicle operating parameters changes due to changes in surface slope encountered by the vehicle and/or the trailer; the method comprising:
providing a trailer backup assist system;
configuring the trailer backup assist system to utilize surface slope data to provide an alert to an operator if a problematic operating condition is present and/or imminent while the vehicle is backing up with a trailer attached thereto; and/or utilize surface slope data to control at least one vehicle operating parameter while the vehicle is backing up with a trailer attached thereto;
the vehicle includes a steering wheel and a power steering system that changes a steering angle in response to steering command signals;
the trailer backup assist system includes an auxiliary steering input feature that can be operated by a user without turning the steering wheel while the vehicle is backing up with a trailer attached thereto to input user curvature requests corresponding to a desired curvature for a path of travel of a vehicle and trailer during backing of the vehicle and trailer;
the trailer backup assist system generates steering command signals based on user curvature requests and surface slope data while the vehicle is backing up with a trailer attached thereto;
the trailer backup assist system adjusts the steering command signals based on the surface slope data such that the vehicle and trailer have substantially consistent trailer curvature response across varying surface topography for a given user curvature request;
the trailer backup assist system is configured to determine a location of at least one problematic topographical feature having a surface slope that exceeds a predefined maximum value; and
adjusting the steering command signals to adjust a path of the trailer to avoid any such problematic topographical features while the vehicle is backing up with a trailer attached thereto.

15. A method of utilizing surface slope data to alert an operator and/or to control a vehicle having a trailer backup assist system for use in backing up the vehicle when a trailer is connected to the vehicle, wherein the vehicle defines a plurality of vehicle operating parameters, and wherein the vehicle and trailer together encounter at least one predefined problematic operating condition that is to be avoided when the trailer is connected to the vehicle and the vehicle is backing up, and wherein, when backing up, a response of the trailer to changes in the vehicle operating parameters changes due to changes in surface slope encountered by the vehicle and/or the trailer; the method comprising:
providing a trailer backup assist system;
configuring the trailer backup assist system to utilize surface slope data to provide an alert to an operator if a problematic operating condition is present and/or imminent while the vehicle is backing up with a trailer attached thereto; and/or utilize surface slope data to control at least one vehicle operating parameter while the vehicle is backing up with a trailer attached thereto;
defining a jackknife condition; and wherein:
the trailer backup assist system utilizes the surface slope data to determine if a jackknife condition is imminent and generates a user warning if a jackknife condition is imminent.

16. The method of claim 15, wherein:
the trailer backup assist system is configured to estimate a time interval until the jackknife condition will occur and to generate a user warning at a predefined estimated time interval prior to the jackknife condition.

17. The method of claim 15, wherein:
the trailer defines a hitch angle relative to the vehicle;
the jackknife condition is a function of at least one of the surface slope data and the trailer angle;
a user warning is generated at smaller hitch angles when the vehicle and trailer are backing up on a sloped surface than when the vehicle and trailer are backing up on a level surface.

18. The method of claim 17, wherein:
the user warning comprises at least one of a visual indicator, an audible indicator, and a tactile indicator.

19. The method of claim 1, wherein:
the trailer backup assist system is configured to alert an operator and/or to control the speed of the vehicle while backing up with a trailer attached to the vehicle based, at least in part, on surface slope data.

20. The method of claim 19, wherein:
the trailer backup assist system controls at least one of a vehicle brake, a trailer brake, an engine torque, and a transmission ratio, based at least in part, on surface slope data.

21. A method of utilizing surface slope data to alert an operator and/or to control a vehicle having a trailer backup assist system for use in backing up the vehicle when a trailer is connected to the vehicle, wherein the vehicle defines a plurality of vehicle operating parameters, and wherein the vehicle and trailer together encounter at least one predefined problematic operating condition that is to be avoided when the trailer is connected to the vehicle and the vehicle is backing up, and wherein, when backing up, a response of the trailer to changes in the vehicle operating parameters changes due to changes in surface slope encountered by the vehicle and/or the trailer; the method comprising:
providing a trailer backup assist system;
configuring the trailer backup assist system to utilize surface slope data to provide an alert to an operator if a problematic operating condition is present and/or imminent while the vehicle is backing up with a trailer attached thereto; and/or utilize surface slope data to control at least one vehicle operating parameter while the vehicle is backing up with a trailer attached thereto;
the trailer backup assist system is configured to alert an operator and/or to control the speed of the vehicle while backing up with a trailer attached to the vehicle based, at least in part, on surface slope data; and wherein:
the trailer backup assist system is configured to determine if the vehicle is accelerating at a rate that is approaching a predefined maximum allowable acceleration rate and to control the vehicle speed whereby the vehicle does not exceed the maximum allowable acceleration rate.

22. The method of claim 19, wherein:
the slope data comprises at least one obstacle comprising a topographical feature to be avoided; and the trailer backup assist system is configured to alert an operator if the vehicle and/or trailer is on a path towards at least one topographical feature to be avoided.

23. The method of claim 22, wherein:
the topographical feature to be avoided comprises a slope that exceeds a predefined maximum allowable slope.

24. A method of controlling a vehicle, comprising:
providing topographical data to a trailer backup assist system;
identifying an obstacle utilizing the topographical data; and
controlling at least one of a vehicle brake and steering system utilizing the trailer backup assist system to avoid the obstacle identified utilizing the topographical data.

25. The method of claim 24, wherein:
the trailer backup assist system includes an auxiliary steering input feature that can be operated by a user without turning the steering wheel to provide a user steering request; and
the trailer backup assist system utilizes user steering requests and topographical data to control a steering angle of a vehicle's front wheels.

* * * * *